(12) United States Patent
Graepel et al.

(10) Patent No.: US 7,840,288 B2
(45) Date of Patent: Nov. 23, 2010

(54) PLAYER RANKING WITH PARTIAL INFORMATION

(75) Inventors: Thore K H Graepel, Cambridge (GB); Rafl Herbrich, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 665 days.

(21) Appl. No.: 11/276,226

(22) Filed: Feb. 17, 2006

(65) Prior Publication Data
US 2006/0184260 A1 Aug. 17, 2006

Related U.S. Application Data

(63) Continuation-in-part of application No. 11/041,752, filed on Jan. 24, 2005, now Pat. No. 7,050,868.

(60) Provisional application No. 60/739,072, filed on Nov. 21, 2005.

(51) Int. Cl.
*G06F 19/00* (2006.01)
(52) U.S. Cl. .......................................... 700/93; 700/92
(58) Field of Classification Search ................... 700/92, 700/93
See application file for complete search history.

(56) References Cited

U.S. PATENT DOCUMENTS 7,050,868 B1 * 5/2006 Graepel et al. ................ 700/93

| 2002/0115488 | A1 | 8/2002 | Berry et al. |
| 2004/0059655 | A1 * | 3/2004 | Seifert et al. ................ 705/35 |
| 2004/0083078 | A1 * | 4/2004 | Feldman ..................... 702/185 |
| 2004/0225387 | A1 | 11/2004 | Smith, III |
| 2005/0233791 | A1 * | 10/2005 | Kane ............................ 463/6 |

FOREIGN PATENT DOCUMENTS

KR 2005-0095667 A 9/2005

OTHER PUBLICATIONS

Mark E. Glickman, Parameter Estimation in Large Dynamic Paired Comparison Experiments, 1999.*
International Search Report for PCT/US2007/004136 mailed Jul. 19, 2007. 10 Pages.

* cited by examiner

*Primary Examiner*—John M Hotaling
*Assistant Examiner*—Kevin Y Kim
(74) *Attorney, Agent, or Firm*—Shook, Hardy & Bacon

(57) ABSTRACT

Scoring of each player may be based on the outcomes of a game between players who compete against each other in one or more teams of one or more players. The scoring may also consider partial play where one or more players of a game only play for a portion of the full time of the game. Additionally or alternatively, the scoring may consider partial rankings of teams where the relative ranking of one team to another may be unknown. Each player's score may be represented as a distribution over potential scores which may indicate a confidence level in the distribution representing the player's score. The scoring may be used to track a player's progress and/or standing within the gaming environment, used in a leaderboard indication of rank, and/or may be used to match players with each other in a future game.

12 Claims, 14 Drawing Sheets

| | 1120 ↓ | 1122 ↓ |
|---|---|---|
| Player A1 | $\frac{2}{n_A+n_B} = \frac{2}{2+2} = \frac{1}{2}$ | 0 |
| Player A2 | $\frac{2}{n_A+n_B} = \frac{2}{2+2} = \frac{1}{2}$ | 0 |
| Player B1 | $\frac{-2}{n_A+n_B} = \frac{-2}{2+2} = -\frac{1}{2}$ | $\frac{2}{n_B+n_C} = \frac{2}{2+2} = \frac{1}{2}$ |
| Player B2 | $\frac{-2}{n_A+n_B} = \frac{-2}{2+2} = -\frac{1}{2}$ | $\frac{2}{n_B+n_C} = \frac{2}{2+2} = \frac{1}{2}$ |
| Player C1 | 0 | $\frac{-2}{n_B+n_C} = \frac{-2}{2+2} = -\frac{1}{2}$ |
| Player C2 | 0 | $\frac{-2}{n_B+n_C} = \frac{-2}{2+2} = -\frac{1}{2}$ |

*FIG. 11*

| | 1220 | 1222 |
|---|---|---|
| Player A1 | $\frac{2 \cdot \frac{1}{2}}{1.5+2} = \frac{1}{3.5} = .286$ | 0 |
| Player A2 | $\frac{2 \cdot 1}{1.5+2} = \frac{2}{3.5} = .571$ | 0 |
| Player B1 | $\frac{-2 \cdot 1}{1.5+2} = \frac{-2}{3.5} = -.571$ | $\frac{2}{n_B + n_C} = \frac{2}{2+2} = \frac{1}{2}$ |
| Player B2 | $\frac{-2 \cdot 1}{1.5+2} = \frac{-2}{3.5} = -.571$ | $\frac{2}{n_B + n_C} = \frac{2}{2+2} = \frac{1}{2}$ |
| Player C1 | 0 | $\frac{-2}{n_B + n_C} = \frac{-2}{2+2} = -\frac{1}{2}$ |
| Player C2 | 0 | $\frac{-2}{n_B + n_C} = \frac{-2}{2+2} = -\frac{1}{2}$ |

*FIG. 12*

| | 1320 | 1322 | 1323 |
|---|---|---|---|
| Player A1 | 1/2 | 0 | 0 |
| Player A2 | 1/2 | 0 | 0 |
| Player B1 | -1/2 | Unknown | Unknown |
| Player B2 | -1/2 | Unknown | Unknown |
| Player C1 | 0 | Unknown | Unknown |
| Player C2 | 0 | Unknown | Unknown |
| Player D1 | 0 | Unknown | Unknown |
| Player D2 | 0 | Unknown | Unknown |

PLAYER RANKING WITH PARTIAL INFORMATION

CROSS-REFERENCE TO RELATED APPLICATIONS

This application is a continuation-in-part of and claims the benefit of U.S. patent application Ser. No. 11/041,752, filed Jan. 24, 2005, titled BAYESIAN SCORING, and Provisional Patent Application Ser. No. 60/739,072, filed Nov. 21, 2005, titled TEAM MATCHING which are both incorporated herein by reference.

BACKGROUND

In ranking players of a game, typical ranking systems simply track the player's skill. For example, Arpad Elo introduced the ELO ranking system which is used in many two-team gaming environments, such as chess, and the like. In the ELO ranking system, the performance or skill of a player is assumed to be measured by the slowly changing mean of a normally distributed random variable. The value of the mean is estimated from the wins, draws, and losses. The mean value is then linearly updated by comparing the number of actual vs. expected game wins and losses.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 11 is a table of an example ranking matrix A;

FIG. 12 is a table of an example ranking matrix A with partial play;

FIG. 13 is a table of an example ranking matrix A with unknown partial rankings.

DETAILED DESCRIPTION

Exemplary Operating Environment

Figure 1:
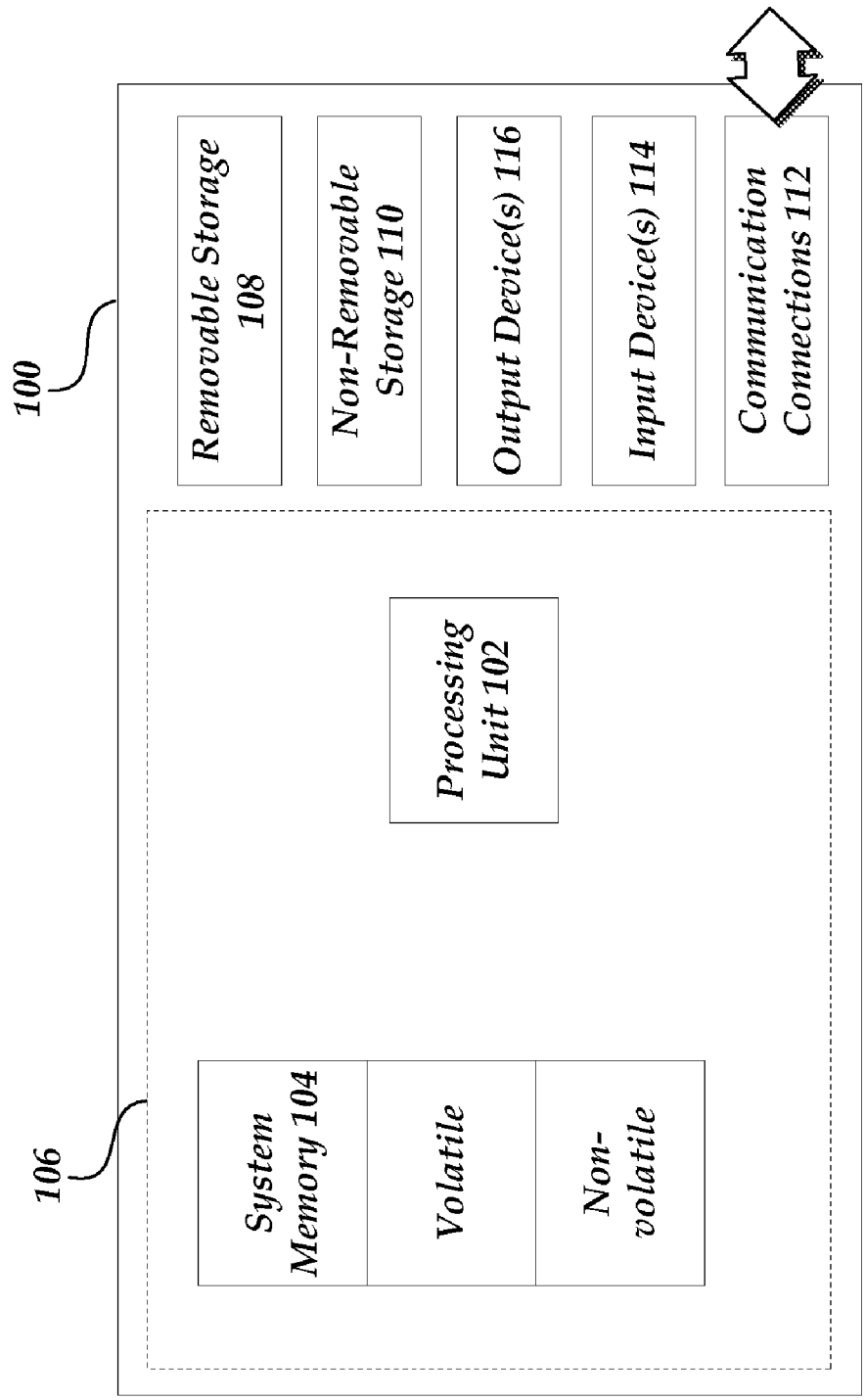
FIG. 1 is an example computing system for implementing a scoring system.

FIG. 1 and the following discussion are intended to provide a brief, general description of a suitable computing environment in which a scoring system may be implemented. The operating environment of FIG. 1 is only one example of a suitable operating environment and is not intended to suggest any limitation as to the scope of use or functionality of the operating environment. Other well known computing systems, environments, and/or configurations that may be suitable for use with a scoring system described herein include, but are not limited to, personal computers, server computers, hand-held or laptop devices, multiprocessor systems, microprocessor based systems, programmable consumer electronics, network personal computers, mini computers, mainframe computers, distributed computing environments that include any of the above systems or devices, and the like.

Although not required, the scoring system will be described in the general context of computer-executable instructions, such as program modules, being executed by one or more computers or other devices. Generally, program modules include routines, programs, objects, components, data structures, etc., that perform particular tasks or implement particular abstract data types. Typically, the functionality of the program modules may be combined or distributed as desired in various environments.

With reference to FIG. 1, an exemplary system for implementing a scoring system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106. Additionally, device 100 may also have additional features and/or functionality. For example, device 100 may also include additional storage (e.g., removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules, or other data. Memory 104, removable storage 108, and non-removable storage 110 are all examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which can be used to store the desired information and which can be accessed by device 100. Any such computer storage media may be part of device 100.

Device 100 may also contain communication connection(s) 112 that allow the device 100 to communicate with other devices. Communications connection(s) 112 is an example of communication media. Communication media typically embodies computer readable instructions, data structures, program modules or other data in a modulated data signal such as a carrier wave or other transport mechanism and includes any information delivery media. The term 'modulated data signal' means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes both storage media and communication media.

Device 100 may also have input device(s) 114 such as keyboard, mouse, pen, voice input device, touch input device, laser range finder, infra-red cameras, video input devices, and/or any other input device. Output device(s) 116 such as display, speakers, printer, and/or any other output device may also be included.

Scoring System

Players in a gaming environment, particularly, electronic on-line gaming environments, may be scored relative to each other or to a predetermined scoring system. As used herein, the score of a player is not a 'score' that a player achieves by gaining points or other rewards within a game; but rather, score means a ranking or other indication of the skill of the player. It should be appreciated that any gaming environment may be suitable for use with the scoring system described further below. For example, players of the game may be in communication with a central server through an on-line gaming environment, directly connected to a game console, play a physical world game (e.g., chess, poker, tennis), and the like.

The scoring may be used to track a player's progress and/or standing within the gaming environment, and/or may be used to match players with each other in a future game. For example, players with substantially equal scores, or scores meeting predetermined and/or user defined thresholds, may be matched to form a substantially equal challenge in the game for each player.

The scoring of each player may be based on the outcome of one or more games between players who compete against each other in two or more teams, with each team having one or more players. The outcome of each game may update the score of each player participating in that game. The outcome of a game may be indicated as a particular winner, a ranked list of participating players, and possibly ties or draws. Each player's score on a numerical scale may be represented as a distribution over potential scores which may be parameterized for each player by a mean score $\mu$ and a score variance $\sigma^2$. The variance may indicate a confidence level in the distribution representing the player's score. The score distribution for each player may be modeled with a Gaussian distribution, and may be determined through a Bayesian inference algorithm.

Figure 2:
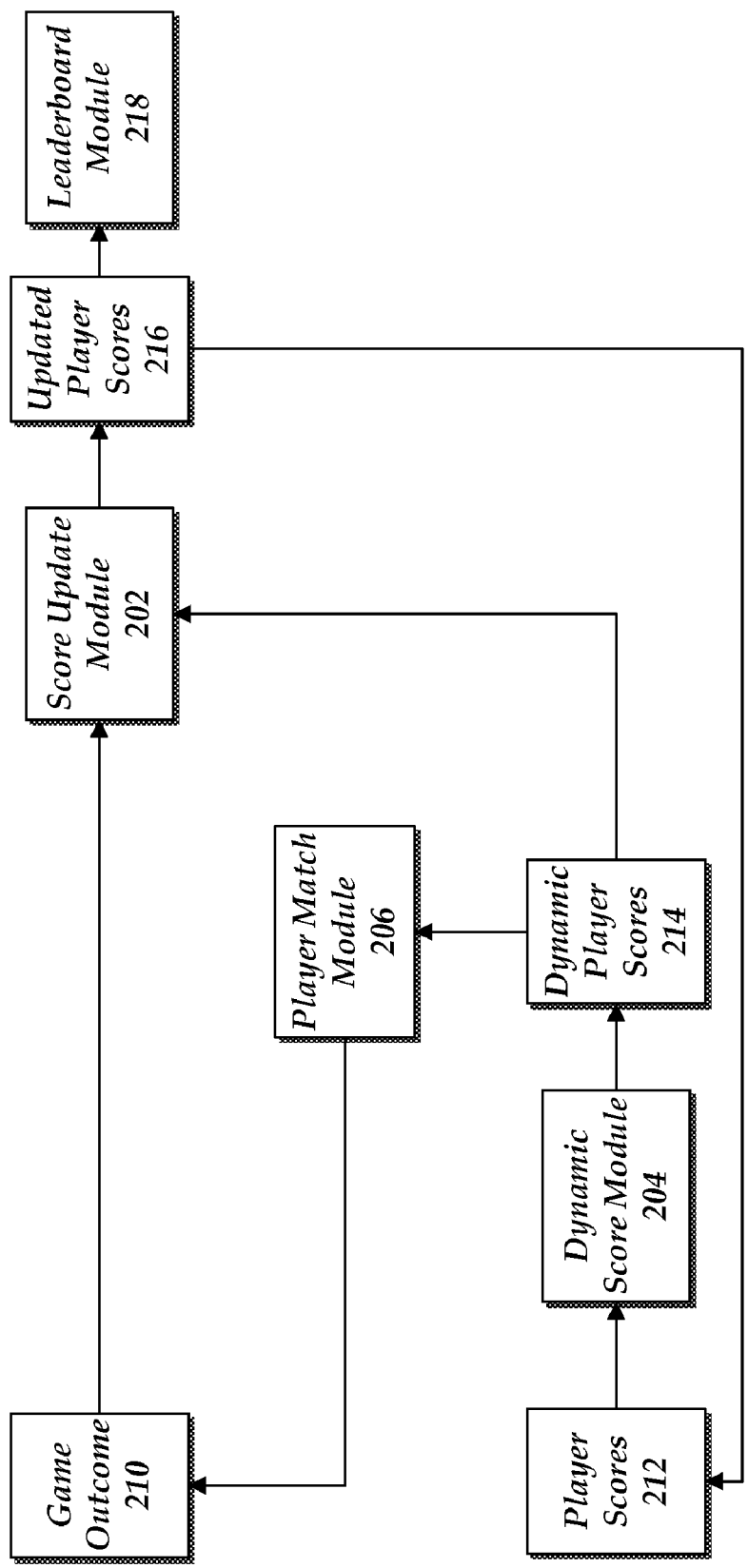
FIG. 2 is a dataflow diagram of an example scoring system.

FIG. 2 illustrates an example scoring system for determining scores for multiple players. Although the following example is discussed with respect to one player opposing another single player in a game to create a game outcome, it should be appreciated that following examples will discuss a team comprising one or more players opposing another team, as well as multi-team games. The scoring system 200 of FIG. 2 includes a score update module which accepts the outcome 210 of a game between two or more players. It should be appreciated that the game outcome may be received through any suitable method. For example, the outcome may be communicated from the player environment, such as an on-line system, to a central processor to the scoring system in any suitable manner, such as through a global communication network. In another example, the scores of the opposing player(s) may be communicated to the gaming system of a player hosting the scoring system. In this manner, the individual gaming system may receive the scores of the opposing players in any suitable manner, such as through a global communication network. In yet another example, the scoring system may be a part of the gaming environment, such as a home game system, used by the players to play the game. In yet another example, the game outcome(s) may be manually input into the scoring system if the gaming environment is unable to communicate the game outcome to the scoring system, e.g., the game is a 'real' world game such as board chess.

As shown in FIG. 2, the outcome 210 may be an identification of the winning team, the losing team, and/or a tie or draw. For example, if two players (player A and player B) oppose one another in a game, the game outcome may be one of three possible results, player A wins and player B loses, player A loses and player B wins, and players A and B draw. Each player has a score 212 which may be updated to an updated score 216 in accordance with the possible change over time due to player improvement (or unfortunate atrophy) and the outcome of the game by both the dynamic score module and the score update module. More particularly, where the player score 212 is a distribution, the mean and variance of each player's score may be updated in view of the outcome and/or the possible change over time due to player improvement (or unfortunate atrophy).

The score update module 202, through the outcomes of one or more games, learns the score of the player. An optional dynamic score module 204 allows the score 212 of one or more players to change over time due to player improvement (or unfortunate atrophy). To allow for player skill changes over time, a player's score, although determined from the outcome of one or more games, may not be static over time. In one example, the score mean value may be increased and/or the score variance or confidence in the score may be broadened. In this manner, the score of each player may be modified to a dynamic player score 214 to allow for improvement of the players. The dynamic player scores 214 may then be used as input to the score update module. In this manner, the score of each player may be learned over a sequence of games played between two or more players.

The dynamic or updated score of each player may be used by a player match module 206 to create matches between players based upon factors such as player indicated preferences and/or score matching techniques. The matched players, with their dynamic player scores 214 or updated scores 216, may then oppose one another and generate another game outcome 210.

A leaderboard module 218 may be used, in some examples, to determine the ranking of two or more players and may provide at least a portion of the ranking list to one or more devices, such as publication of at least a portion of the leaderboard ranking list on a display device, storing the leaderboard ranking list for access by one or more players, and the like.

In some cases, to accurately determine the ranking of a number n of players, at least log(n!), or approximately n log(n) game outcomes may be evaluated to generate a complete leaderboard with approximately correct rankings. The base of the logarithm depends on the number of unique outcomes between the two players. In this example, the base is three since there are three possible outcomes (player A wins, player A loses, and players A and B draw). This lower bound of evaluated outcomes may be attained only if each of the outcomes is fully informative, that is, a priori, the outcomes of the game have a substantially equal probability. Thus, in many games, the players may be matched to have equal strength to increase the knowledge attained from each outcome. Moreover, the players may appreciate a reasonable challenge from a peer player. In some cases, in a probabilistic treatment of the player ranking and scoring, the matching of players may incorporate the 'uncertainty' in the rank of the player.

In some cases, there may be m different levels of player rankings. If the number of different levels m is substantially less than the number of players n, then the minimal number of (informative) games may be reduced in some cases to n log (m). More over, if the outcome of a game is the ranking between k teams, then each game may provide up to log(k!) bits, and in this manner, approximately at least n log(n)/log (k!) informative games may be played to extract sufficient information to rank the players.

It is to be appreciated that although the dynamic score module 204, the score update module 202, the player match module 206, and the leaderboard module are discussed herein as separate processes within the scoring system 200, any function or component of the scoring system 200 may be provided by any of the other processes or components. Moreover, it is to be appreciated that other scoring system configurations may be appropriate. For example, more than one dynamic scoring module 204, score update module 202, score vector, and/or player match module may be provided, more than one database may be available for storing score, rank, and/or game outcomes, any portion of the modules of the scoring system may be hard coded into software supporting the scoring system, and/or any portion of the scoring system 200 may provided by any computing system which is part of a network or external to a network.

Learning Scores

The outcome of a game between two or more players and/or teams may be indicated in any suitable manner such as through a ranking of the players and/or teams for that particular game. For example, in a two player game, the outcomes may be player A wins, player A loses, or players A and B draw. In accordance with the game outcome, each player of a game may be ranked in accordance with a numerical scale. For example, the rank $r_i$ of a player may have a value of 1 for the winner and a value of 2 for a loser. In a tie, the two players will have the same rank. In a multi-team example, the players may be enumerated from 10 to n. A game between k teams may be specified by the k indices $i_j \in \{1, \ldots, n\}^{nj}$ of the $n_j$ players in the jth team ($n_j$=1 for games where there are only single players and no multi-player teams) and the rank $r_j$ achieved by each team may be represented as r:=$(r1, \ldots, r_k)^T \in \{1, \ldots, k\}^k$. Again, the winner may be assumed to have the rank of 1.

A player's skill may be represented by a score. A player's score $s_i$ may indicate the player's standing relative to a standard scale and/or other players. The score may be individual, individual to one or more people acting as a player (e.g., a team), or to a game type, a game application, and the like. In some cases, the skill of a team may be a function $S(s_{i_j})$ of all the skills or scores of the players in the jth team. The function may be any suitable function. Where the team includes only a single player, the function S may be the identify function, e.g., $S(s_{i_j})=s_i$.

The score $s_i$ of each player may have a stochastic transitive property. More particularly, if player i is scored above player j, then player i is more likely to win against player j as opposed to player j winning against player i. In mathematical terms:

$$s_i \geq s_j \rightarrow P(\text{player } i \text{ wins}) \geq P(\text{player } j \text{ wins}) \quad (1)$$

This stochastic transitive property implies that the probability of player twinning or drawing is greater than or equal to one half because, in any game between two players, there are only three mutually exclusive outcomes (player i wins, loses, or draws).

To estimate the score for each player such as in the score update module 202 of FIG. 2, a Bayesian learning methodology may be used. With a Bayesian approach, the belief in the true score $s_i$ of a player may be indicated as a probability density of the score (i.e., P(s)). In the following examples, the probability density of the score representing the belief in the true score is selected as a Gaussian with a mean μ and a diagonal covariance matrix (diag($\sigma^2$)). The Gaussian density may be shown as:

$$P(s)=N(s; \mu, \text{diag}(\sigma^2)) \quad (2)$$

Selecting the Gaussian allows the distribution to be unimodal with mode μ. In this manner, a player would not be expected to alternate between widely varying levels of play. Additionally, a Gaussian representation of the score may be stored efficiently in memory. In particular, assuming a diagonal covariance matrix effectively leads to allowing each individual score for a player i to be represented with two values: the mean $\mu_i$ and the variance $\sigma_i^2$.

The initial and updated scores of each player may be stored in any suitable manner. It is to be appreciated that the score of a player may be represented as a mean μ and variance $\sigma^2$ or mean μ and standard deviation σ, and the like. For example, the mean and variance of each player may be stored in separate vectors, e.g., a mean vector μ and variance vector $\sigma^2$, in a data store, and the like. If all the means and variances for all possible players are stored in vectors, e.g., μ and $\sigma^2$, then the update equations may update only those means and variances associated with the players that participated in the game outcome. Alternatively or additionally, the score for each player may be stored in a player profile data store, a score matrix, and the like. The score for each player may be associated with a player in any suitable manner, including association with a player identifier i, placement or location in the data store may indicate the associated player, and the like.

It is to be appreciated that any suitable data store in any suitable format may be used to store and/or communicate the scores and game outcome to the scoring system 200, including a relational database, object-oriented database, unstructured database, an in-memory database, or other data store. A storage array may be constructed using a flat file system such as ACSII text, a binary file, data transmitted across a communication network, or any other file system. Notwithstanding these possible implementations of the foregoing data stores, the term data store and storage array as used herein refer to any data that is collected and stored in any manner accessible by a computer.

The Gaussian model of the distribution may allow efficient update equations for the mean $\mu_i$ and the variance $\sigma_i^2$ as the scoring system is learning the score for each player. After observing the outcome of a game, e.g., indicated by the rank r of the players for that game, the belief distribution or density P(s) in the scores s (e.g., score $s_i$ for player i and score $s_j$ for player j) may be updated using Bayes rule given by:

$$P(s \mid r, \{i_1, \ldots, i_k\}) = \frac{P(r \mid s, \{i_1, \ldots, i_k\}) P(s \mid \{i_1, \ldots, i_k\})}{P(r \mid \{i_1, \ldots, i_k\})} \quad (3)$$

$$= \frac{P(r \mid s_{i_1}, \ldots, s_{i_k}) P(s)}{P(r \mid \{i_1, \ldots, i_k\})}$$

where the variable $i_k$ is an identifier or indicator for each player of the team k participating in the game. In the two player example, the vector $i_1$ for the first team is an indicator for player A and the vector $i_2$ for the second team is an indicator for player B. In the multiple player example discussed further below, the vector i may be more than one for each team. In the multiple team example discussed further below, the number of teams k may be greater than two. In a multiple team example of equation (3), the probability of the ranking given the scores of the players $P(r|s_{i_1}, \ldots, s_{i_k})$ may be modified given the scores of the team $S(s_{ik})$ which is a function of the scores of the individual players of the team.

The new updated belief, $P(s|r, \{i_1, \ldots i_k\})$ is also called the posterior belief (e.g., the updated scores 214, 216) and may be used in place of the prior belief $P(s)$, e.g., the player scores 212, in the evaluation of the next game for those opponents. Such a methodology is known as on-line learning, e.g., over time only one belief distribution $P(s)$ is maintained and each observed game outcome r for the players participating $\{i_1, \ldots, i_k\}$ is incorporated into the belief distribution.

After incorporation into the determination of the players' scores, the outcome of the game may be disregarded. However, the game outcome r may not be fully encapsulated into the determination of each player's score. More particularly, the posterior belief $P((s|r, \{i_1, \ldots i_k\})$ may not be represented in a compact and efficient manner, and may not be computed exactly. In this case, a best approximation of the true posterior may be determined using any suitable approximation technique including expectation propagation, variational inference, assumed density filtering, Laplace approximation, maximum likelihood, and the like. Assumed density filtering (ADF) computes the best approximation to the true posterior in some family that enjoys a compact representation—such as a Gaussian distribution with a diagonal covariance. This best approximation may be used as the new prior distribution. The examples below are discussed with reference to assumed density filtering solved either through numerical integration and/or expectation propagation.

Gaussian Distribution

The belief in the score of each player may be based on a Gaussian distribution. A Gaussian density having n dimensions is defined by:

$$N(x; \mu, \Sigma) = (2\pi)^{-\frac{n}{2}} |\Sigma|^{-\frac{1}{2}} \exp\left(-\frac{1}{2}(x-\mu)^T \Sigma^{-1}(x-\mu)\right) \quad (4)$$

The Gaussian of $N(x)$ may be defined as a shorthand notation for a Gaussian defined by $N(x;0,I)$. The cumulative Gaussian distribution function may be indicated by $\Phi(t;\mu,\sigma^2)$ which is defined by:

$$\Phi(t; \mu, \sigma^2) = P_{x \cong N(x;\mu,\sigma^2)}(x \le t) = \int_{-\infty}^{t} N(x; \mu, \sigma^2) dx \quad (5)$$

Again, the shorthand of $\Phi(t)$ indicates a cumulative distribution of $\Phi(t;0,1)$. The notation of $\langle f(x) \rangle_{x \sim P}$ denotes the expectation of f over the random draw of x, that is $\langle f(x) \rangle_{x \sim P} = \int f(x) dP(x)$. The posterior probability of the outcome given the scores or the probability of the scores given the outcome may not be a Gaussian. Thus, the posterior may be estimated by finding the best Gaussian such that the Kullback-Leibler divergence between the true posterior and the Gaussian approximation is minimized. For example, the posterior $P(\theta|x)$ may be approximated by $N(\theta, \mu_x^*, \Sigma_x^*)$ where the superscript * indicates that the approximation is optimal for the given x. In this manner, the mean and variance of the approximated Gaussian posterior may be given by:

$$\mu_x^* = \mu + \Sigma g_x \quad (6)$$

$$\Sigma_x^* = \Sigma - \Sigma(g_x g_x^T - 2G_x)\Sigma \quad (7)$$

Where the vector $g_x$ and the matrix $G_x$ are given by:

$$g_x = \left.\frac{\partial \log(Z_x(\tilde{\mu}, \tilde{\Sigma}))}{\partial \tilde{\mu}}\right|_{\tilde{\mu}=\mu, \tilde{\Sigma}=\Sigma} \quad (8)$$

$$G_x = \left.\frac{\partial \log(Z_x(\tilde{\mu}, \tilde{\Sigma}))}{\partial \tilde{\Sigma}}\right|_{\tilde{\mu}=\mu, \tilde{\Sigma}=\Sigma} \quad (9)$$

and the function $Z_x$ is defined by:

$$Z_x(\mu, \Sigma) = \int t_x(\theta) N(\theta; \mu; \Sigma) d\theta = P(x) \quad (10)$$

Rectified Truncated Gaussians

A variable x may be distributed according to a rectified double truncated Gaussian (referred to as rectified Gaussian from here on) and annotated by $x \sim R(x, \mu, \sigma^2, \alpha, \beta)$ if the density of x is given by:

$$R(x; \mu, \sigma^2, \alpha, \beta) = I_{x \in (\alpha, \beta)} \frac{N(x; \mu, \sigma^2)}{\Phi(\beta; \mu, \sigma^2) - \Phi(\alpha; \mu, \sigma^2)} \quad (11)$$

$$= I_{x \in (\alpha, \beta)} \frac{N\left(\frac{x-\mu}{\sigma}\right)}{\sigma\left(\Phi\left(\frac{\beta-\mu}{\sigma}\right) - \Phi\left(\frac{\alpha-\mu}{\sigma}\right)\right)} \quad (12)$$

When taking the limit of the variable $\beta$ as it approaches infinity, the rectified Gaussian may be denoted as $R(x; \mu, \sigma^2, \alpha)$.

The class of the rectified Gaussian contains the Gaussian family as a limiting case. More particularly, if the limit of the rectified Gaussian is taken as the variable $\alpha$ approaches infinity, then the rectified Gaussian is the Normal Gaussian indicated by $N(x; \mu, \sigma^2)$ used as the prior distribution of the scores.

The mean of the rectified Gaussian is given by:

$$\langle x \rangle_{x \sim R} = \mu + \sigma v\left(\frac{\mu}{\sigma}, \frac{\alpha}{\sigma}, \frac{\beta}{\sigma}\right) \quad (13)$$

where the function $v(\cdot, \alpha, \beta)$ is given by:

$$v(t, \alpha, \beta) = \frac{N(\alpha - t) - N(\beta - t)}{\Phi(\beta - t) - \Phi(\alpha - t)} \quad (14)$$

The variance of the rectified Gaussian is given by:

$$\langle x^2 \rangle_{x \sim R} - (\langle x \rangle_{x \sim R})^2 = \sigma^2\left(1 - w\left(\frac{\mu}{\sigma}, \frac{\alpha}{\sigma}, \frac{\beta}{\sigma}\right)\right) \quad (15)$$

where the function $w(\cdot, \alpha, \beta)$ is given by:

$$w(t, \alpha, \beta) = v^2(t, \alpha, \beta) + \frac{(\beta - t)N(\beta - t) - (\alpha - t)N(\alpha - t)}{\Phi(\beta - t) - \Phi(\alpha - t)} \quad (16)$$

As $\beta$ approaches infinity, the functions $v(\cdot, \alpha, \beta)$ and $w(\cdot, \alpha, \beta)$ may be indicated as $v(\cdot, \alpha)$ and $w(\cdot, \alpha)$ and determined using:

$$v(t, \alpha) = \lim_{\beta \to \infty} v(t, \alpha, \beta) = \frac{N(t-\alpha)}{\Phi(t-\alpha)} \quad (17)$$

$$w(t, \alpha) = \lim_{\beta \to \infty} w(t, \alpha, \beta) = v(t, \alpha) \cdot (v(t, \alpha) - (t-\alpha)) \quad (18)$$

These functions may be determined using numerical integration techniques, or any other suitable technique. The function $w(\cdot,\alpha)$ may be a smooth approximation to the indicator function $I_{t \leq \alpha}$ and may be always bounded by $[0,1]$. In contrast, the function $v(\cdot,\alpha)$ may grow roughly like $\alpha$-t for $t<\alpha$ and may quickly approach zero for $t>\alpha$.

The auxiliary functions $\tilde{v}(t,\epsilon)$ and $\tilde{w}(t,\epsilon)$ may be determined using:

$$\tilde{v}(t,\epsilon) = v(t,-\epsilon,\epsilon) \quad (19)$$

$$\tilde{w}(t,\epsilon) = w(t,-\epsilon,\epsilon) \quad (20)$$

Learning Scores over Time

A Bayesian learning process for a scoring system learns the scores for each player based upon the outcome of each match played by those players. Bayesian learning may assume that each player's unknown, true score is static over time, e.g., that the true player scores do not change. Thus, as more games are played by a player, the updated player's score 216 of FIG. 2 may reflect a growing certainty in this true score. In this manner, each new game played may have less impact or effect on the certainty in the updated player score 216.

However, a player may improve (or unfortunately worsen) over time relative to other players and/or a standard scale. In this manner, each player's true score is not truly static over time. Thus, the learning process of the scoring system may learn not only the true score for each player, but may allow for each player's true score to change over time due to changed abilities of the player. To account for changed player abilities over time, the posterior belief of the scores $P(s|r,\{i_1, \ldots i_k\})$ may be modified over time. For example, not playing the game for a period of time (e.g., $\Delta t$) may allow a player's skills to atrophy or worsen. Thus, the posterior belief of the score of a player may be modified by a dynamic score module based upon any suitable factor, such as the playing history of that player (e.g., time since last played) to determine a dynamic score 216 as shown in FIG. 2. More particularly, the posterior belief used as the new prior distribution may be represented as the posterior belief $P(s_i|\Delta t)$ of the score of the player with index i, given that he had not played for a time of $\Delta t$. Thus, the modified posterior distribution may be represented as:

$$P(s_i \mid \Delta t) = \int P(s_i|\mu_i + \Delta\mu)P(\Delta\mu|\Delta t)d(\Delta\mu) \quad (21)$$

$$= \int N(s_i, \mu_i + \Delta\mu, \sigma_i^2)N(\Delta\mu; 0, \tau^2(\Delta t))d(\Delta\mu)$$

$$= N(s_i, \mu_i, \sigma_i^2 + \tau^2(\Delta t))$$

where the first term $P(s_i|\mu)$ is the belief distribution of the score of the player with the index i, and the second term $P(\Delta\mu|\Delta t)$ quantifies the belief in the change of the unknown true score at a time of length $\Delta t$ since the last update. The function $\tau(\cdot)$ is the variance of the true score as a function of time not played (e.g., $\Delta t$). The function $\tau(\Delta t)$ may be small for small times of $\Delta t$ to reflect that a player's performance may not change over a small period of non-playing time. This function may increase as $\Delta t$ increases (e.g., hand-eye coordination may atrophy, etc.). In the examples below, the dynamic score function $\tau$ may return a constant value $\tau_0$, if the time passed since the last update is greater than zero as this indicates that at least one more game was played. If the time passed is zero, then the function $\tau$ may return 0. The constant function $\tau_0$ for the dynamic score function $\tau$ may be represented as:

$$\tau^2(\Delta t) = I_{\Delta t > 0}\tau_0^2 \quad (22)$$

where I is the indicator function.

Inference to Match Players

The belief in a particular game outcome may be quantified with all knowledge obtained about the scores of each player, $P(s)$. More particularly, the outcome of a potential game given the scores of selected players may be determined. The belief in an outcome of a game for a selected set of players may be represented as:

$$P(r \mid \{i_1, \ldots i_k\}) = \int P(r|s, \{i_1, \ldots i_k\})P(s|\{i_1, \ldots i_k\})ds \quad (23)$$

$$= \int P(r|S(s_{i_1}), \ldots, S(s_{i_k}))P(s)ds$$

where $S(s_{i_1}), \ldots, S(s_{i_k})$ is $s_A$ and $s_B$ for a two payer game. Such a belief in a future outcome may be used in matching players for future games, as discussed further below.

Two Player Match Example

With two players (player A and player B) opposing one another in a game, the outcome of the game can be summarized in one variable y which is 1 if player A wins, 0 if the players tie, and −1 if player A loses. In this manner, the variable y may be used to uniquely represent the ranks r of the players. In light of equation (3) above, the score update algorithm may be derived as a model of the game outcome y given the scores $s_1$ and $s_2$ as:

$$P(r|s_A, s_B) = P(y(r)|s_A, s_B) \quad (24)$$

where $y(r) = \text{sign}(r_B - r_A)$, where $r_A$ is 1 and $r_B$ is 2 if player A wins, and $r_A$ is 2 and $r_B$ is 1 if player B wins, and $r_A$ and $r_B$ are both 1 if players A and B tie.

Figure 3:
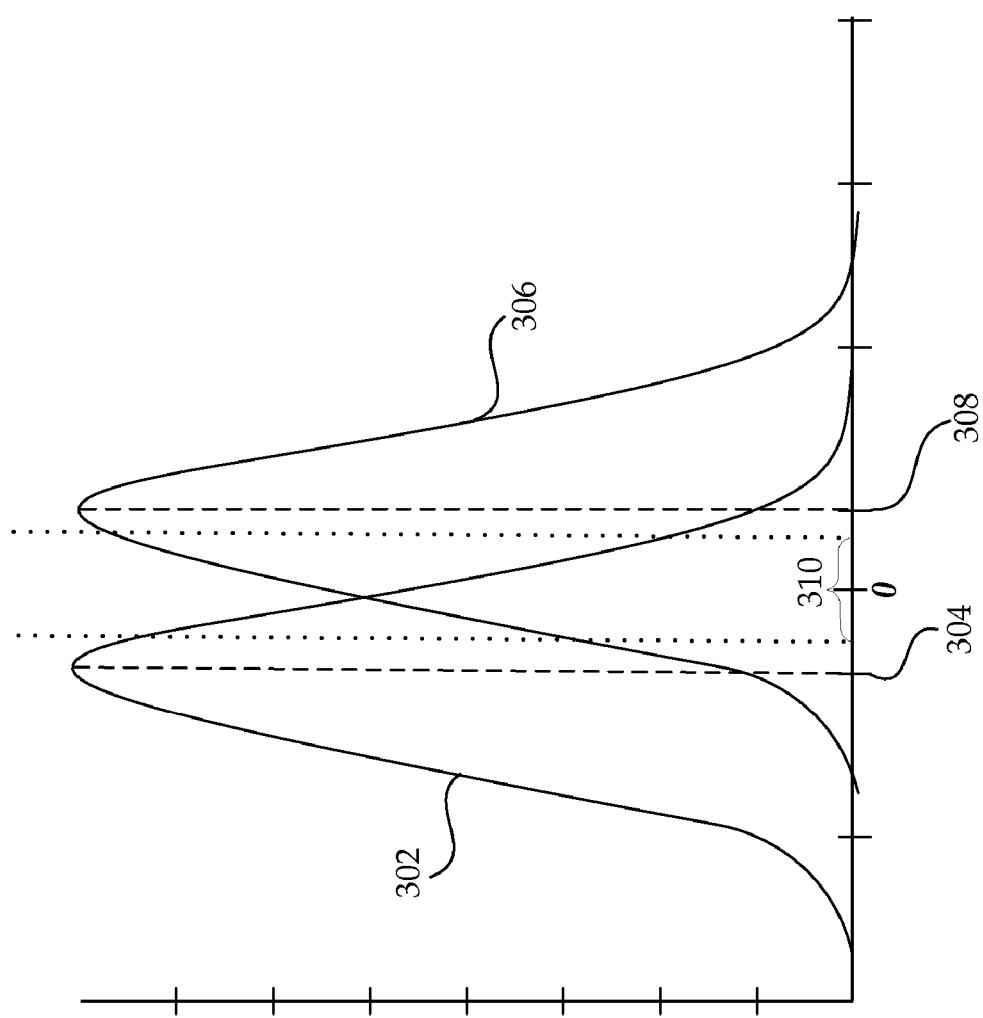
FIG. 3 is an example graph of two latent score distributions.

The outcome of the game (e.g., variable y), may be based on the performance of all participating players (which in the two player example are players A and B). The performance of a player may be represented by a latent score $x_i$ which may follow a Gaussian distribution with a mean equivalent to the score $s_i$ of the player with index i, and a fixed latent score variance $\beta^2$. More particularly, the latent score $x_i$ may be represented as $N(x_i; s_i, \beta^2)$. Example graphical representations of the latent scores are shown in FIG. 3 as Gaussian curves 302 and 306 respectively. The scores $s_A$ and $s_B$ are illustrated as lines 304 and 308 respectively.

The latent scores of the players may be compared to determine the outcome of the game. However, if the difference between the teams is small or approximately zero, then the outcome of the game may be a tie. In this manner, a latent tie margin variable $\epsilon$ may be introduced as a fixed number to illustrate this small margin of substantial equality between two competing players. Thus, the outcome of the game may be represented as:

Player A is the winner if: $x_A > x_B + \epsilon$ (25)

Player B is the winner if: $x_B > x_A + \epsilon$ (26)

Player A and B tie if: $|x_A - x_B| \leq \epsilon$ (27)

A possible latent tie margin is illustrated in FIG. 3 as the range 310 of width 2ϵ around zero. In some cases, the latent tie margin may be set to approximately 0, such as in a game where a draw is impracticable, such as a racing game. In other cases, the latent tie margin may be set larger or narrower depending on factors such as the type of game (e.g., capture the flag) team size, and the like).

Since the two latent score curves are independent (due to the independence of the latent scores for each player), then the probability of an outcome y given the scores of the individual players A and B, may be represented as:

$$P(y|s_A, s_B) \begin{cases} = P(\Delta < \epsilon) & \text{if } y = -1 \quad (28) \\ = P(|\Delta| \leq \epsilon) & \text{if } y = 0 \quad (29) \\ = P(\Delta > \epsilon) & \text{if } y = +1 \quad (30) \end{cases}$$

where $\Delta$ is the difference between the latent scores $x_A$ and $x_B$ (e.g., $\Delta = x_A - x_B$).

Figure 4:
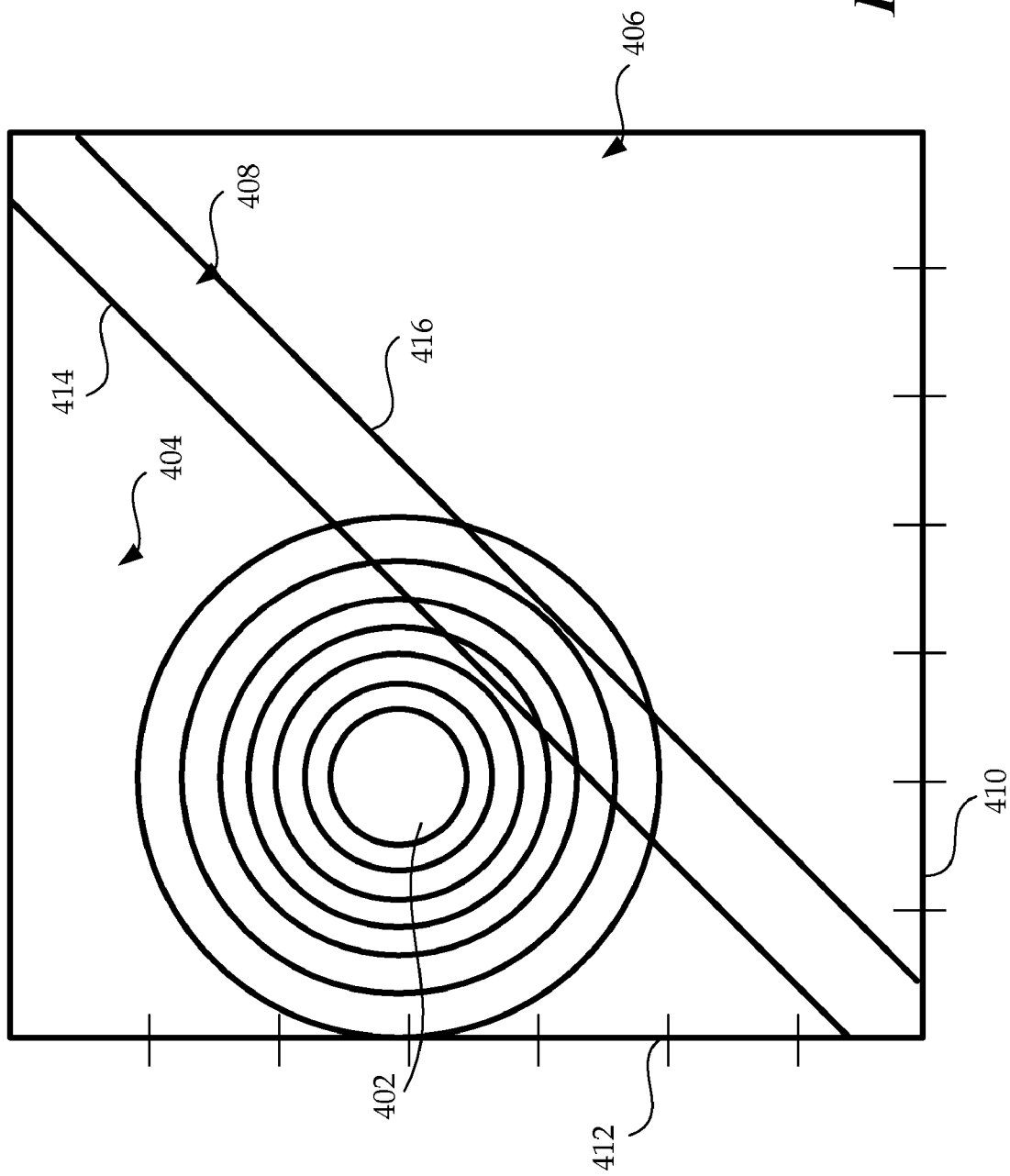
FIG. 4 is an example graph of the joint distribution of the scores of two players.

The joint distribution of the latent scores for player A and player B are shown in FIG. 4 as contour lines forming a 'bump' 402 in a graph with the first axis 410 indicating the latent score of player A and the second axis 412 indicating the latent score of player B. The placement of the 'bump' 402 or joint distribution may indicate the likelihood of player A or B winning by examining the probability mass of the area of the region under the 'bump' 402. For example, the probability mass of area 404 above line 414 may indicate that player B is more likely to win, the probability mass of area 406 below line 416 may indicate that player A is more likely to win, and the probability mass of area 408 limited by lines 414 and 416 may indicate that the players are likely to tie. In this manner, the probability mass of area 404 under the joint distribution bump 402 is the probability that player B wins, the probability mass of area 406 under the joint distribution bump 402 is the probability that player A wins, and the probability mass of area 408 under the joint distribution bump 402 is the probability that the players tie. As shown in the example joint distribution 402 of FIG. 4, it is more likely that player B will win.

Two Player Score Update

As noted above, the score (e.g., mean $\mu_i$ and variance $\sigma_i^2$) for each player i (e.g., players A and B), may be updated knowing the outcome of the game between those two players (e.g., players A and B). More particularly, using an ADF approximation, the update of the scores of the participating players may follow the method 500 shown in FIG. 5. The static variable(s) may be initialized 502. For example, the latent tie zone $\epsilon$, the dynamic time update constant $\tau_0$, and/or the latent score variation $\beta$ may be initialized. Example initial values for these parameters may be include: $\beta$ is within the range of approximately 100 to approximately 400 and in one example may be approximately equal to 250, $\tau_0$ is within the range of approximately 1 to approximately 10 and may be approximately equal to 10 in one example, and $\epsilon$ may depend on many factors such as the draw probability and in one example may be approximately equal to 50. The score $s_i$ (e.g., represented by the mean $\mu_i$ and variance $\sigma_i^2$) may be received 504 for each of the players i, which in the two player example includes mean $\mu_A$ and variance $\sigma_A^2$ for player A and mean $\mu_B$ and variance $\sigma_B^2$ for player B.

Before a player has played a game, the player's score represented by the mean and variance may be initialized to any suitable values. In a simple case, the means of all players may be all initialized at the same value, for example $\mu_i = 1200$. Alternatively, the mean may be initialized to a percentage (such as 20-50%, and in some cases approximately 33%) of the average mean of the established players. The variance may be initialized to indicate uncertainty about the initialized mean, for example $\sigma^2 = 400^2$. Alternatively, the initial mean and/or variance of a player may be based in whole or in part on the score of that player in another game environment.

As described above, the belief may be updated 505 to reflect a dynamic score in any suitable manner. For example, the belief may be updated based on time such as by updating the variance of each participating player's score based on a function $\tau$ and the time since the player last played. The dynamic time update may be done in the dynamic score module 204 of the scoring system of FIG. 2. As noted above, the output of the dynamic score function $\tau$ may be a constant To for all times greater than 0. In this manner, To may be zero on the first time that a player plays a game, and may be the constant To thereafter. The variance of each player's score may be updated by:

$$\sigma_i^2 \leftarrow \sigma_i^2 + \tau_0^2 \quad (31)$$

To update the scores based on the game outcome, parameters may be computed 506. For example, a parameter c may be computed as the sum of the variances, such that parameter c is:

$$c = (n_A + n_B)\beta^2 + \sigma_A^2 + \sigma_B^2 \quad (32)$$
$$= 2\beta^2 + \sigma_A^2 + \sigma_B^2 \quad (33)$$

where $n_A$ is the number of players in team A (in the two player example is 1) and $n_B$ is the number of players in team B (in the two player example is 1).

The parameter h may be computed based on the mean of each player's score and the computed parameter c in the two player example, the parameter h may be computed as:

$$h_A = \frac{\mu_A - \mu_B}{\sqrt{c}} \quad (34)$$

$$h_B = \frac{\mu_B - \mu_A}{\sqrt{c}} \quad (35)$$

which, indicates that $h_A = -h_B$. The parameter $\epsilon'$ may be computed 506 based on the number of players, the latent tie zone $\epsilon$, and the parameter c as:

$$\epsilon' = \frac{\epsilon(n_A + n_B)}{2\sqrt{c}} \quad (36)$$

And for the two player example, this leads to:

$$\epsilon' = \frac{\epsilon}{\sqrt{c}} \quad (37)$$

The outcome of the game between players A and B may be received 508. For example, the game outcome may be represented as the variable y which is −1 if player B wins, 0 if the players tie, and +1 if player A wins. To change the belief in the scores of the participating players, such as in the score update module of FIG. 2, the mean and variance of the each score may be updated 510. More particularly, if the player A wins (e.g., y=1), then the mean $\mu_A$ of the winning player A may be updated as:

$$\mu_A \leftarrow \mu_A + \frac{\sigma_A^2}{\sqrt{c}} v(h_A, \varepsilon') \quad (38)$$

The mean $\mu_B$ of the losing player B may be updated as:

$$\mu_B \leftarrow \mu_B - \frac{\sigma_B^2}{\sqrt{c}} v(h_A, \varepsilon') \quad (39)$$

The variance $\sigma_i^2$ of each player i (A and B in the two player example) may be updated when player A wins as:

$$\sigma_i^2 \leftarrow \sigma_i^2 \left(1 - \frac{\sigma_i^2}{c} w(h_A, \varepsilon')\right) \quad (40)$$

However, if player B wins (e.g., y=−1), then the mean $\mu_A$ of the losing player A may be updated as:

$$\mu_A \leftarrow \mu_A - \frac{\sigma_A^2}{\sqrt{c}} v(h_B, \varepsilon') \quad (41)$$

The mean $\mu_B$ of the winning player B may be updated as:

$$\mu_B \leftarrow \mu_B + \frac{\sigma_B^2}{\sqrt{c}} v(h_B, \varepsilon') \quad (42)$$

The variance $\sigma_i^2$ of each player i (A and B) may be updated when player B wins as:

$$\sigma_i^2 \leftarrow \sigma_i^2 \left(1 - \frac{\sigma_i^2}{c} w(h_B, \varepsilon')\right) \quad (43)$$

If the players A and B draw, then the mean $\mu_A$ of the player A may be updated as:

$$\mu_A \leftarrow \mu_A + \frac{\sigma_A^2}{\sqrt{c}} \tilde{v}(h_A, \varepsilon') \quad (44)$$

The mean $\mu_B$ of the player B may be updated as:

$$\mu_B \leftarrow \mu_B + \frac{\sigma_B^2}{\sqrt{c}} \tilde{v}(h_B, \varepsilon') \quad (45)$$

The variance $\sigma_A^2$ of player A may be updated when the players tie as:

$$\sigma_A^2 \leftarrow \sigma_A^2 \left(1 - \frac{\sigma_A^2}{c} \tilde{w}(h_A, \varepsilon')\right) \quad (46)$$

The variance $\sigma_B^2$ of player B may be updated when the players tie as:

$$\sigma_B^2 \leftarrow \sigma_B^2 \left(1 - \frac{\sigma_B^2}{c} \tilde{w}(h_B, \varepsilon')\right) \quad (47)$$

In equations (38-47) above, the functions $v()$, $w()$, $\tilde{v}()$, and $\tilde{w}()$ may be determined from the numerical approximation of a Gaussian. Specifically, functions $v()$, $w()$, $\tilde{v}()$, and $\tilde{w}()$ may be evaluated using equations (17-20) above using numerical methods such as those described in Press et al., Numerical Recipes in C: the Art of Scientific Computing (2d. ed.), Cambridge, Cambridge University Press, ISBN-0-521-43108-5, which is incorporated herein by reference, and by any other suitable numeric or analytic method.

The above equations to update the score of a player are different from the ELO system in many ways. For example, the ELO system assumes that each player's variance is equal, e.g., well known. In another example, the ELO system does not use a variable K factor which depends on the ratio of the uncertainties of the players. In this manner, playing against a player with a certain score allows the uncertain player to move up or down in larger steps than in the case when playing against another uncertain player.

The updated values of the mean and variance of each player's score (e.g., updated scores 216 of FIG. 2) from the score update module 202 of FIG. 2 may replace the old values of the mean and variance (scores 212). The newly updated mean and variance of each player's score incorporate the additional knowledge gained from the outcome of the game between players A and B.

Two Player Matching

The updated beliefs in a player's score may be used to predict the outcome of a game between two potential opponents. For example, a player match module 206 shown in FIG. 2 may use the updated and/or maintained scores of the players to predict the outcome of a match between any potential players and match those players meeting match criteria, such as approximately equal player score means, player indicated preferences, approximately equal probabilities of winning and/or drawing, and the like.

To predict the outcome of a game, the probability of a particular outcome y given the means and standard deviations of the scores for each potential player, e.g., $P(y|s_A, s_B)$ may be computed. Accordingly, the probability of the outcome ($P(y)$) may be determined from the probability of the outcome given the player scores with the scores marginalized out.

Figure 6:
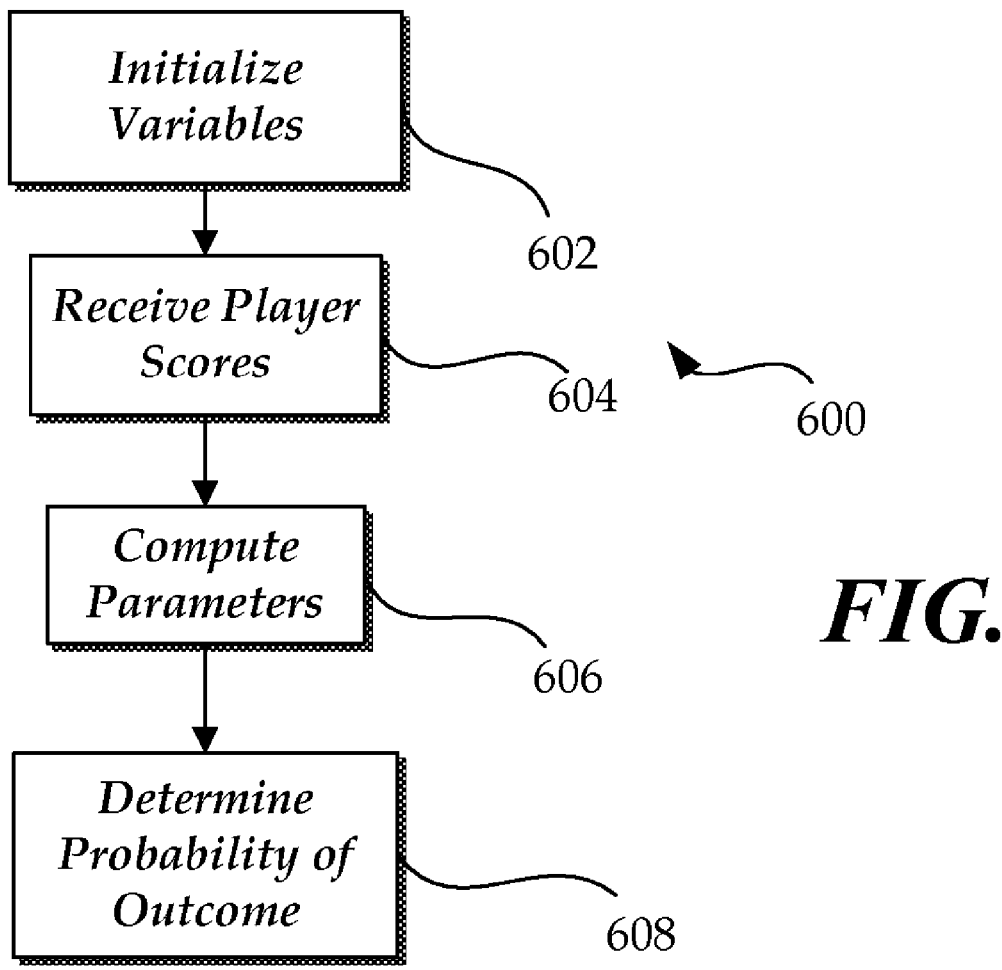
FIG. 6 is a flow chart of an example method of matching two players or teams based on their score distributions.

FIG. 6 illustrates an example method 600 of predicting a game outcome which will be described with respect to a game between two potential players (player A and player B). The static variable(s) may be initialized 602. For example, the latent tie zone $\varepsilon$, the dynamic time update constant $\tau_0$, and/or the latent score variation $\beta$ may be initialized. The score $s_i$ (e.g., represented by the mean $\mu_i$ and variance $\sigma_i^2$) may be received 604 for each of the players i who are participating in the predicted game. In the two player example, the player scores include mean $\mu_A$ and variance $\sigma_A^2$ for player A, and mean $\mu_B$ and variance $\sigma_B^2$ for player B.

Parameters may be determined 606. The parameter c may be computed 606 as the sum of the variances using equation (32) or (33) above as appropriate. Equations (32) and (33) for the parameter c may be modified to include the dynamic score aspects of the player's scores, e.g., some time $\Delta t$ has passed since the last update of the scores. The modified parameter c may be computed as:

$$c = (n_A + n_B)\beta^2 2 + \sigma_A^2 + \sigma_B^2 + (n_A + n_B)\tau_0 \quad (48)$$

where $n_A$ is the number of players in team A (in this example 1 player) and $n_B$ is the number of players in team B (in this example 1 player). The parameter $\epsilon'$ may be computed using equation (36) or (37) above as appropriate.

The probability of each possible outcome of the game between the potential players may be determined 608. The probability of player A winning may be computed using:

$$P(y = 1) = \Phi\left(\frac{\mu_A - \mu_B - \epsilon'}{\sqrt{c}}\right) \quad (49)$$

The probability of player B winning may be computed using:

$$P(y = -1) = \Phi\left(\frac{\mu_B - \mu_A - \epsilon'}{\sqrt{c}}\right) \quad (50)$$

As noted above, the function $\Phi$ indicates a cumulative Gaussian distribution function having an argument of the value in the parentheses and a mean of zero and a standard deviation of one. The probability of players A and B having a draw may be computed using:

$$P(y=0) = 1 - P(y=1) - P(y=-1) \quad (51)$$

The determined probabilities of the outcomes may be used to match potential players for a match, such as comparing the probability of either team winning or drawing with a predetermined or user provided threshold or other preference. A predetermined threshold corresponding to the probability of either team winning or drawing may be any suitable value such as approximately 25%. For example, players may be matched to provide a substantially equal distribution over all possible outcomes, their mean scores may be approximately equal (e.g., within the latent tie margin), and the like. Additional matching techniques which are also suitable for the two player example are discussed below with reference to the multi-team example.

Two Teams

The two player technique described above may be expanded such that 'player A' includes one or more players in team A and 'player B' includes one or more players in team B. For example, the players in team A may have any number of players $n_A$ indicated by indices $i_A$, and team B may have any number of players $n_B$ indicated by indices $i_B$. A team may be defined as one or more players whose performance in the game achieves a single outcome for all the players on the team. Each player of each team may have an individual score $s_i$ represented by a mean $\mu_i$ and a variance $\sigma_i^2$.

Two Team Score Update

Since there are only two teams, like the two player example above, there may be three possible outcomes to a match, i.e., team A wins, team B wins, and teams A and B tie. Like the two player example above, the game outcome may be represented by a single variable y, which in one example may have a value of one if team A wins an, 0 if the teams draw, and −1 if team B wins the game. In view of equation (1) above, the scores may be updated for the players of the game based on a model of the game outcome y given the skills or scores $s_{iA}$ and $s_{iB}$ for each team. This may be represented as:

$$P(r|s_{iA}, s_{iB}) = P(y(r)|s_{iA}, s_{iB}) \quad (51.1)$$

where the game outcome based on the rankings y(r) may be defined as:

$$y(r) = \text{sign}(r_B - r_A) \quad (51.2)$$

Like the latent scores of the two player match above, a team latent score t(i) of a team with players having indices i may be a linear function of the latent scores $x_j$ of the individual players of the team. For example, the team latent score t(i) may equal $b(i)^T x$ with b(i) being a vector having n elements where n is the number of players. Thus, the outcome of the game may be represented as:

Team A is the winner if: $t(i_A) > t(i_B) + \epsilon$ (52)

Team B is the winner if: $t(i_B) > t(i_A) + \epsilon$ (53)

Team A and B tie if: $|t(i_A) - t(i_B)| \leq \epsilon$ (54)

where $\epsilon$ is the latent tie margin discussed above. With respect to the example latent scores of FIG. 3, the latent scores of teams A and B may be represented as line 304 and 308 respectively.

The probability of the outcome given the scores of the teams $s_{i_A}$ and $s_{i_B}$ is shown in equations (28-30) above. However, in the team example, the term $\Delta$ of equations (28-30) above is the difference between the latent scores of the teams $t(i_A)$ and $t(i_B)$. More particularly, the term $\Delta$ may be determined as:

$$\Delta = t(i_A) - t(i_B) = (b(i_A) - b(i_B))^T x = a^T x \quad (55)$$

where x is a vector of the latent scores of all players and the vector a comprises linear weighting coefficients.

The linear weighting coefficients of the vector a may be derived in exact form making some assumptions. For example, one assumption may include if a player in a team has a positive latent score, then the latent team score will increase; and similarly, if a player in a team has a negative latent score, then the latent team score will decrease. This implies that the vector b(i) is positive in all components of i. The negative latent score of an individual allows a team latent score to decrease to cope with players who do have a negative impact on the outcome of a game. For example, a player may be a so-called 'team killer.' More particularly, a weak player may prove to be a liability and thereby may increase the latent team score for the other team rather than contributing to his team's score himself by scoring. The fact that most players contribute positively can be taken into account in the prior probabilities of each individual score. Another example assumption may be that players who do not participate in a team (are not playing the match and/or are not on a participating team) should not influence the team score. Hence, all components of the vector b(i) not in the vector i should be zero (since the vector x as stored or generated may contain the latent scores for all players, whether playing or not). In some cases, only the participating players in a game may be included in the vector x, and in this manner, the vector b(i) may be non-zero and positive for all components (in i). An additional assumption may include that if two players have identical latent scores, then including each of them into a given team may change the team latent score by the same amount. This may imply that the vector b(i) is a positive constant in all components of i. Another assumption may be that if each team doubles in size and the additional players are replications of the original players (e.g., the new players have the same scores $s_i$, then the probability of winning or a draw for either team is unaffected. This may imply that the vector b(i) is equal to the inverse average team size in all components of i such that:

$$b(i) = \frac{2}{n_A + n_B} \sum_{j \in i} e_j \quad (56)$$

where the vector e is the unit n-vector with zeros in all components except for component j which is 1, and the terms $n_A$ and $n_B$ are the number of players in teams A and B respectively. With the four assumptions above, the weighting coefficients a are uniquely determined.

If the teams are equal sized, e.g., $n_A + n_B$, then the mean of the latent player scores, and hence, the latent player scores x, may be translated by an arbitrary amount without a change in the distribution $\Delta$. Thus, the latent player scores effectively form an interval scale. However, in some cases, the teams may have uneven numbering, e.g., $n_A$ and $n_B$ are not equal. In this case, the latent player scores live on a ratio scale in the sense that replacing two players each of latent score x with one player of latent score 2x does not change the latent team score. In this manner, a player with mean score s is twice as good as a player with mean score s/2. Thus, the mean scores indicate an average performance of the player. On the other hand, the latent scores indicate the actual performance in a particular game and exist on an interval scale because in order to determine the probability of winning, drawing, and losing, only the difference of the team latent scores is used, e.g., $t(i_A) - t(i_B)$.

The individual score $s_i$ represented by the mean $\mu_i$ and variance $\sigma_i^2$ of each player i in a team participating in a game may be updated based upon the outcome of the game between the two teams. The update equations and method of FIG. 5 for the two player example may be modified for a two team example. With reference to the method 500 of FIG. 5, the latent tie zone $\epsilon$, the dynamic time update constant $\tau_0$, and the latent score variation $\beta$ may be initialized 502 as noted above. Similarly, the score $s_i$ (e.g., represented by the mean $\mu_i$ and variance $\sigma_i^2$) may be received 504 for each of the players i in each of the two teams, which in the two team example includes mean $\mu_{A_i}$ and variance $\sigma_{A_i}^2$ for the players i in team A and mean $\mu_{B_i}$ and variance $\sigma_{B_i}^2$ for the players i in team B.

Since the dynamic update to the belief (e.g., based on time since last played) depends only on the variance of that player (and possibly the time since that player last played), the variance of each player in each team may be updated 505 in any suitable manner such as by using equation (31) above. As noted above, the update based on time may be accomplished through the dynamic score module 204 of FIG. 2.

Figure 5:
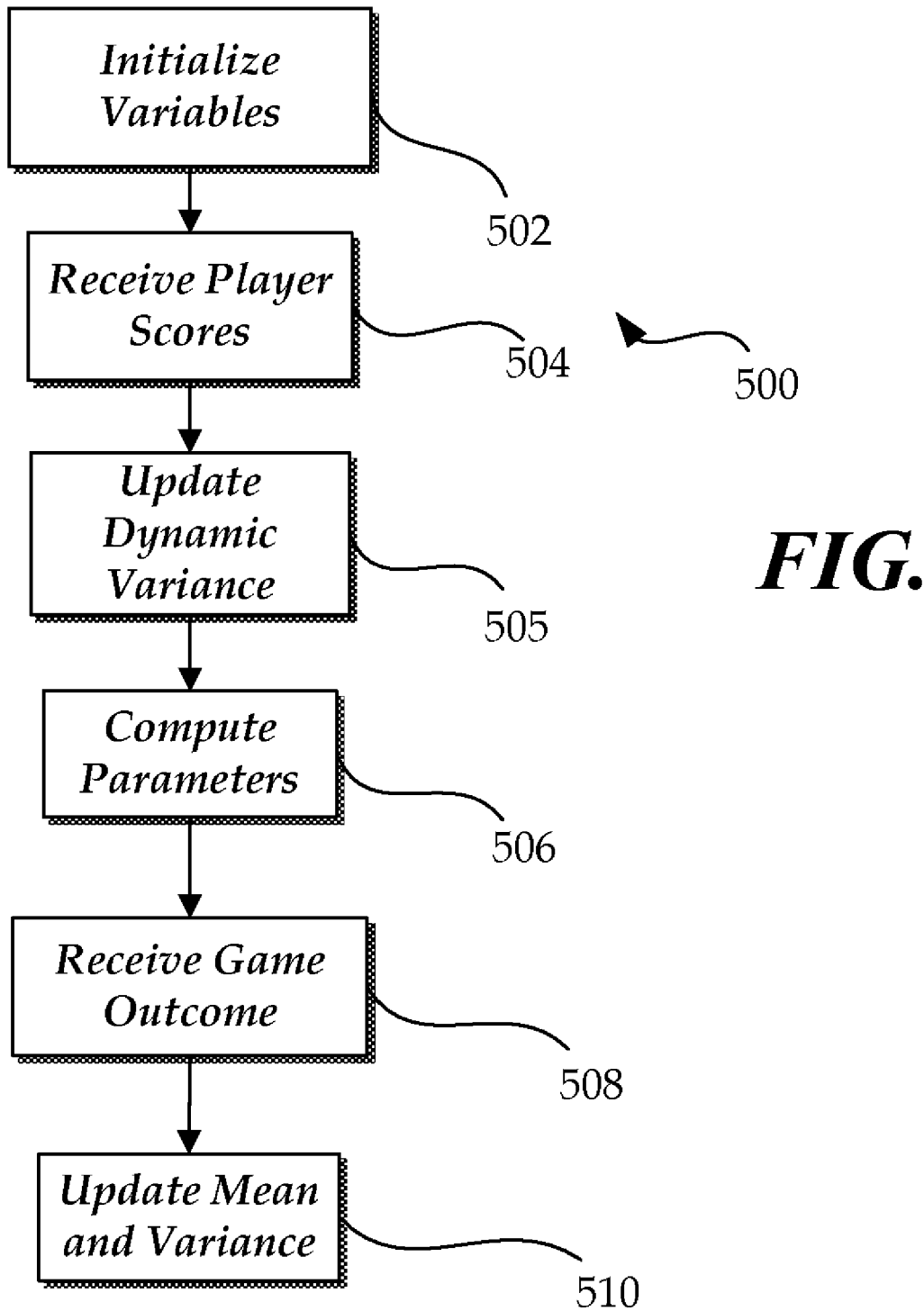
FIG. 5 is a flow chart of an example method of updating scores of two players or teams.

With reference to FIG. 5, the parameters may be computed 506 similar to those described above with some modification to incorporate the team aspect of the scores and outcome. The parameter c may be computed 506 as the sum of the variances, as noted above. However, in a two team example where each team may have one or more players, the variances of all players participating in the game must be summed. Thus, for the two team example, equation (32) above may be modified to:

$$c = (n_A + n_B)\beta^2 + \sum_{i=1}^{n_A} \sigma_{A_i}^2 + \sum_{i=1}^{n_B} \sigma_{B_i}^2 \quad (57)$$

The parameters $h_A$ and $h_B$ may be computed 506 as noted above in equations (34-35) based on the mean of each team's score $\mu_A$ and $\mu_B$ and the computed parameter c. The team mean scores $\mu_A$ and $\mu_B$ for teams A and team B respectively may be computed as the sum of the means of the player(s) for each team as:

$$\mu_A = \sum_{i=1}^{n_A} \mu_{A_i} \quad (58)$$

$$\mu_B = \sum_{i=1}^{n_B} \mu_{B_i} \quad (59)$$

The parameter $\epsilon'$ may be computed 506 as $$\varepsilon' = \frac{\varepsilon(n_A + n_B)}{2\sqrt{c}} \quad (59.1)$$

where $n_A$ is the number of players in team A, $n_B$ is the number of players in team B.

The outcome of the game between team A and team B may be received 508. For example, the game outcome may be represented as the variable y which is equal to $-1$ if team B wins, 0 if the teams tie, and $+1$ if team A wins. To change the belief in the probability of the previous scores of each participating player of each team, the mean and variance of each participating player may be updated 510 by modifying equations (38-46) above. If team A wins the game, then the individual means may be updated as:

$$\mu_{A_i} \leftarrow \mu_{A_i} + \frac{\sigma_{A_i}^2}{\sqrt{c}} v(h_A, \varepsilon') \quad (60)$$

$$\mu_{B_i} \leftarrow \mu_{B_i} - \frac{\sigma_{B_i}^2}{\sqrt{c}} v(h_A, \varepsilon') \quad (61)$$

The variance $\sigma_i^2$ of each player i (of either team A or B) may be updated when team A wins as shown in equation (40) above.

However, if team B wins (e.g., y=$-1$), then the mean $\mu_{Ai}$ of each participating player may be updated as:

$$\mu_{A_i} \leftarrow \mu_{A_i} - \frac{\sigma_{A_i}^2}{\sqrt{c}} v(h_B, \varepsilon') \quad (62)$$

$$\mu_{B_i} \leftarrow \mu_{B_i} + \frac{\sigma_{B_i}^2}{\sqrt{c}} v(h_B, \varepsilon') \quad (63)$$

The variance $\sigma_i^2$ of each player i (of either team A or B) may be updated when team B wins as shown in equation (43) above.

If the teams A and B draw, then the mean $\mu_{A_i}$ and $\mu_{B_j}$ of each player of the teams A and B respectively may be updated as:

$$\mu_{A_i} \leftarrow \mu_{A_i} + \frac{\sigma_{A_i}^2}{\sqrt{c}} \tilde{v}(h_A, \varepsilon') \quad (64)$$

$$\mu_{B_i} \leftarrow \mu_{B_i} + \frac{\sigma_{B_i}^2}{\sqrt{c}} \tilde{v}(h_B, \varepsilon') \qquad (65)$$

The variance $\sigma_{A_i}^2$ of each player in team A may be updated when the teams tie as:

$$\sigma_{A_i}^2 \leftarrow \sigma_{A_i}^2 \left(1 - \frac{\sigma_{A_i}^2}{c} \tilde{w}(h_A, \varepsilon')\right) \qquad (66)$$

The variance $\sigma_{B_i}^2$ of each player in team A may be updated when the teams tie as:

$$\sigma_{B_i}^2 \leftarrow \sigma_{B_i}^2 \left(1 - \frac{\sigma_{B_i}^2}{c} \tilde{w}(h_B, \varepsilon')\right) \qquad (67)$$

As with equations (38-43), the functions v( ), w( ), and $\tilde{v}$( ), $\tilde{w}$( ) may be evaluated using equations (17-20) above using numerical methods. In this manner, the updated values of the mean and variance of each player's score may replace the old values of the mean and variance to incorporate the additional knowledge gained from the outcome of the game between teams A and B.

Two Team Matching

Like the two team scoring update equations above, the matching method of FIG. 6 may be modified to accommodate two teams of one or more players each. Like above, the static variables may be initialized 602. The score $s_i$ (such as the mean $\mu_{A_i}$ and $\mu_{B_i}$ and the variance $\sigma_{A_i}^2$ and $\sigma_{B_i}^2$ for each player i of each respective team A and B) may be received 604 for each of the players. In addition, the matchmaking criteria may take into account the variability of scores within the team. For example, it may be desirable to have teams comprising players having homogeneous scores, because in some cases they may better collaborate.

The parameters may be determined 606 as noted above. For example, the parameter c may be computed using equation (57), the mean of each team $\mu_A$ and $\mu_B$ may be computed using equations (58) and (59), and the parameter $\varepsilon'$ may be computed using equation (36).

The probability of each possible outcome of the game between the two potential teams may be determined 608. The probability of team A winning may be computed using equation (49) above. The probability of team B winning may be computed using equation (50) above. The probability of a draw may be computed using equation (51) above. The determined probabilities of the outcomes may be used to match potential teams for a game, such as comparing the probability of either team winning and/or drawing, the team and/or player ranks, and/or the team and/or player scores with a predetermined or user provided threshold.

Multiple Teams

The above techniques may be further expanded to consider a game that includes multiple teams, e.g., two or more opposing teams which may be indicated by the parameter j. The index j indicates the team within the multiple opposing teams and ranges from 1 to k teams, where k indicates the total number of opposing teams. Each team may have one or more players i, and the jth team may have a number of players indicated by the parameter $n_j$ and players indicated by $i_j$.

Knowing the ranking r of all k teams allows the teams to be re-arranged such that the ranks $r_j$ of each team may be placed in rank order. For example, the rank of each team may be placed in rank-decreasing order such that $r_{(1)} \leq r_{(2)} \leq \ldots \leq r_{(k)}$ where the index operator ( ) is a permutation of the indices j from 1 to k. Since in some cases, the rank of 1 is assumed to indicate the winner of the game, the rank-decreasing order may represent a numerically increasing order. In this manner, the outcome r of the game may be represented in terms of the permutation of team indices and a vector $y \in \{0, +1\}^{k-1}$. For example, ($y_j = +1$) if team (j) was winning against team (j+1), and ($y_j = 0$) if team (j) was drawing against team (j+1). In this manner, the elements of the vector y may be indicated as $y_j = \text{sign}(r_{(j+1)} - r_{(j)})$.

Like the example above with the two teams, the outcome of the game may be based upon the performance or latent scores of all participating players. The latent score $x_i$ may follow a Gaussian distribution with a mean equivalent to the score $s_i$ of the player with index i, and the fixed latent score variance $\beta^2$. In this manner, the latent score $x_i$ may be represented by $N(x_i; s_i, \beta^2)$. The latent score t(i) of a team with players having indices in the vector i may be a linear function of the latent scores x of the individual players. In this manner, the latent scores may be determined as $t(i) = b(i)^T x$ with b(i) as described above with respect to the two team example. In this manner, given a sample x of the latent scores, the ranking is such that the team with the highest latent team score t(i) is at the first rank, the team with the second highest team score is at the second rank, and the team with the smallest latent team score is at the lowest rank. Moreover, two teams will draw if their latent team scores do not differ by more than the latent tie margin $\varepsilon$. In this manner, the ranked teams may be re-ordered according to their value of the latent team scores. After re-ordering the teams based on latent team scores, the pairwise difference between teams may be considered to determine if the team with the higher latent team score is winning or if the outcome is a draw (e.g., the scores differ by less than $\varepsilon$).

To determine the re-ordering of the teams based on the latent scores, a k-1 dimensional vector $\Delta$ of auxiliary variables may be defined where:

$$\Delta_j := t(i_{(j)}) - t(i_{(j+1)}) = a_j^T x \qquad (68)$$

In this manner, the vector $\Delta$ may be defined as:

$$\Delta = A^T x = \begin{bmatrix} a_1^T \\ \ldots \\ a_{k-1}^T \end{bmatrix} x \qquad (69)$$

Since the latent scores x follow a Gaussian distribution (e.g., $x \sim N(x; s, \beta^2 I)$), the vector $\Delta$ is governed by a Gaussian distribution (e.g., $\Delta \sim N(\Delta; A^T s, \beta^2 A^T A)$). In this manner, the probability of the ranking r (encoded by the matrix A based on the permutation operator ( ) and the k-1 dimensional vector y) can be expressed by the joint probability over $\Delta$ as:

$$P(y | s_{i_1}, \ldots, s_{i_k}) = \prod_{j=1}^{k-1} (P(\Delta_j > \varepsilon))^{y_j} (P(|\Delta_j| \leq \varepsilon))^{1-y_j} \qquad (70)$$

The belief in the score of each player ($P(s_i)$), which is parameterized by the mean scores $\mu$ and variances $\sigma^2$, may be updated given the outcome of the game in the form of a ranking r. The belief may be determined using assumed density filtering with standard numerical integration methods (for example, Gentz, et al., Numerical Computation of Multivariate Normal Probabilities, Journal of Computational and Graphical Statistics 1, 1992, pp. 141-149.), the expectation propagation technique (see below), and any other suitable technique. In the special case that there are two teams (e.g., k=2), the update equations reduce to the algorithms described above in the two team example. And similarly, if each of the two teams has only one player, the multiple team equations reduce to the algorithms described above in the two player example.

In this example, the update algorithms for the scores of players of a multiple team game may be determined with a numerical integration for Gaussian integrals. Similarly, the dynamic update of the scores based on time since the last play time of a player may be a constant $\tau_0$ for non-play times greater than 0, and 0 for a time delay between games of 0 or at the first time that a player plays the game.

Figure 7:
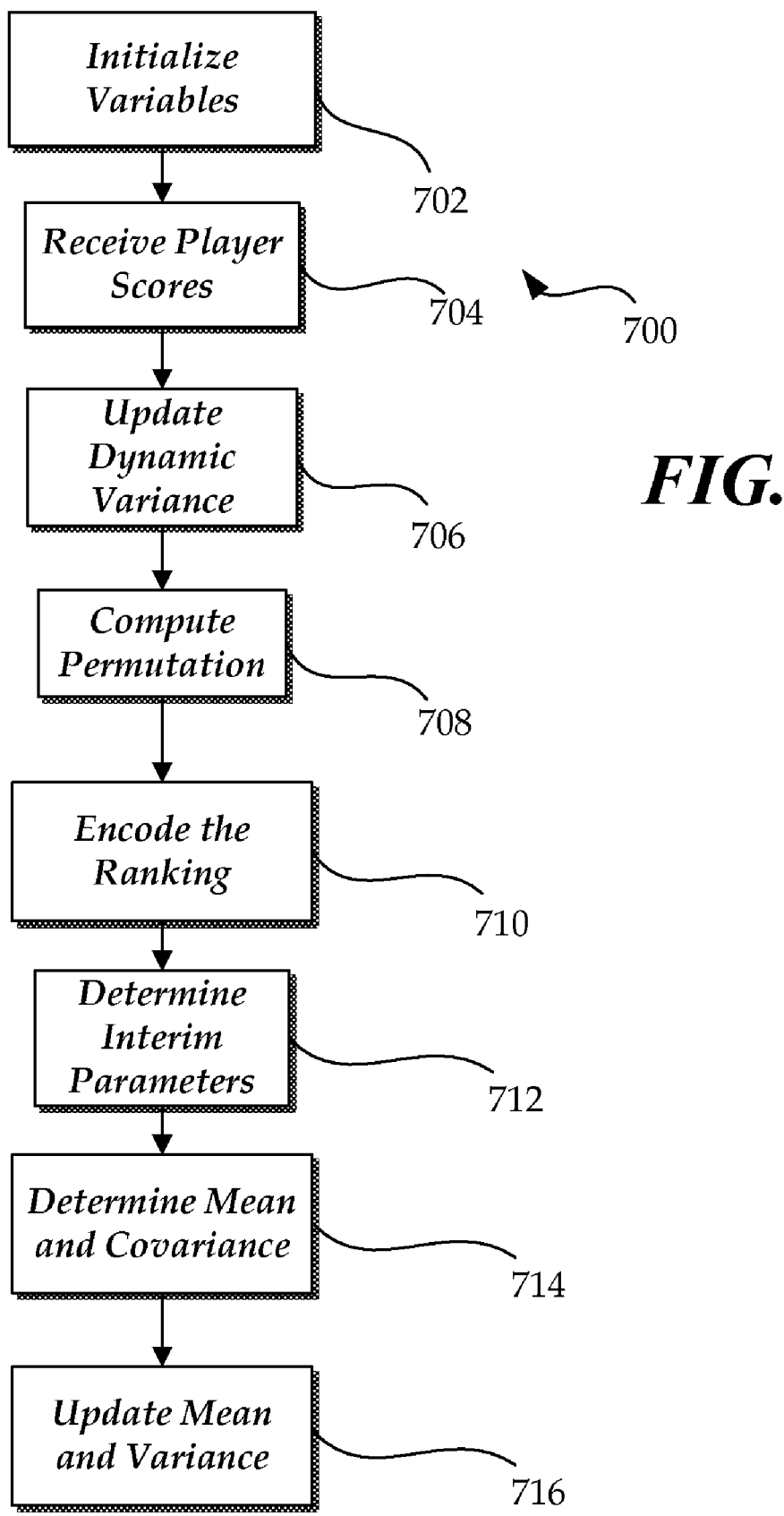
FIG. 7 is a flow chart of an example method of updating scores of multiple teams.

FIG. 7 illustrates an example method 700 of updating the scores of players playing a multiple team game. The latent tie zone $\epsilon$, the dynamic time update constant $\tau_0$, and the latent score variation $\beta$ may be initialized 702 as noted above. In addition, the matrix A having k-1 columns and n rows (i.e., the total number of players in all teams) may be initialized 702 with any suitable set of numbers, such as 0. The score $s_i$ (e.g., represented by the mean $\mu_i$ and variance $\sigma_i^2$) may be received 704 for each of the players i in each of the teams, which in the multiple team example includes mean $\mu_{j_i}$ and variance $\sigma_{j_i}^2$ for each player i in each team j.

Since the dynamic update to the belief may be based on time, the dynamic update may depend on the variance of that player (and possibly the time since that player last played). Thus, the variance of each player may be updated 706 using equation (31) above. In this manner, for each player in each team, the dynamic update to the variance may be determined before the game outcome is evaluated. More particularly, the update to the variance based on time since the player last played the game, and the player's skill may have changed in that period of time before the current game outcome is evaluation. Alternatively, the dynamic update may be done at any suitable time, such as after the game outcome and before score update, after the scores are updated based on the game outcome, and the like.

The scores may be rank ordered by computing 708 the permutation ( ) according to the ranks r of the players participating in the game. For example, the ranks may be placed in decreasing rank order.

The ranking r may be encoded 710 by the matrix A. More particularly, for each combination of the $n_{(j)}$ and $n_{(j+1)}$ players of team (j) and (j+1), the matrix element $A_{row,j}$ may be determined using equations (71) and (72) below. Specifically, for $n_j$ players $i_{(j+1)}$:

$$A_{row,j} = 2/(n_{(j)} + n_{(j+1)}) \quad (71)$$

where the row variable is defined by the player $i_{(j)}$ which means that the row variable varies from 1 to the total number of players in all teams, the column variable is defined by the index j which varies from 1 to k-1 (where k is the number of teams), and $n_{(j)}$ is the number of players on the (j)th team, and $n_{(j+1)}$ is the number of players on the (j+1)th team. For all $n_{j+1}$ players $i_{(j+1)}$:

$$A_{row,j+1} = -2/(n_{(j)} + n_{(j+1)}) \quad (72)$$

where the row variable is defined by the player $i_{(j+1)}$, the column variable is defined by the index j which varies from 1 to k-1 (where k is the number of teams), and $n_{(j)}$ is the number of players on the (j)th team, and $n_{(j+1)}$ is the number of players on the (j+1)th team.

For example, teams may play a game and be identified by Team A, Team B, and Team C, with each team having two payers identified by Player A1, Player A2, Player B1, Player B2, Player C1, and Player C2. After the game, Team A may win over both Teams B and C, and Team B may win over Team C. An example ranking matrix (matrix A) of the players is shown by matrix 1100 of FIG. 11. Specifically, the ranking matrix 1100 has two columns 1102, 1104 defined by the index j which varies from 1 to 2 (i.e., 1 to k-1 where k is the number of teams which in the illustrated example is three). The ranking matrix 1100 has six rows 1106, 1108, 1110, 1112, 1114, 1116 representing each of the two players in each of the three teams, i.e., Player A1, Player A2, Player B1, Player B2, Player C1, and Player C2 respectively. The player rankings for Players A1 and A2 are encoded in the ranking matrix 1100 at matrix elements 1120, 1122, 1124, 1126. Specifically, the player rankings of Players A1 and A2 at matrix elements 1120, 1124 in column 1102 are determined using Equation (71) above as $2/(n_A+n_B)=2/(2+2)=1/2$ since each of Team A and Team B has two players. The player rankings of Players A1 and A2 at matrix elements 1122, 1126 in column 1104 are determined as zero. The player rankings for Players B1 and B2 are encoded in the ranking matrix 1100 at matrix elements 1128, 1130, 1132, 1134. Specifically, the player rankings of Players B1 and B2 at matrix elements 1128, 1132 in column 1102 are determined using Equation (72) above as $-2/(n_A+n_B)=-2/(2+2)=-1/2$ since each of Team A and Team B has two players. The player rankings of Players B1 and B2 at matrix elements 1130, 1134 in column 1104 are determined using Equation (71) above as $2/(n_B+n_C)=2/(2+2)=1/2$ since each of Team B and Team C has two players. The player rankings of Players C1 and C2 are encoded in the ranking matrix 1100 at matrix elements 1136, 1138, 1140, 1142. Specifically, the player rankings of Players C1 and C2 at matrix elements 1136, 1140 in column 1102 are determined as zero. The player rankings of Players C1 and C2 at matrix elements 1138, 1142 in column 1104 are determined using Equation (72) above as $-2/(n_B+n_C)=-2/(2+2)=-1/2$ since each of Team B and Team C has two players.

In some cases, one or more players may enter a game late, leave a game early for any number of reasons such as connection is broken, late entry, leave game because not like the outcome, leave game due to interest, entry and exit determined on third party such as a coach, and the like. Thus, in some cases, the partial time to play the game leading to the game outcome may be used to weight the rankings. In this manner, if one team has a player drop out, then the remaining players of that team may not be penalized for losing the game, since that would be an expected outcome. Conversely, the remaining players of a team may receive an extra benefit or skill update if they win the game since that would be an unexpected outcome, e.g., a 3 player team wins against a 4 player team.

To implement partial play into the ranking matrix A, the ranking may be weighted based on an average team size. Specifically, in one example, the fractional time played in a game $p_{j_k}$ (of player k of team j) may be determined for each player participating in the game. The fractional time played $p_{j_k}$ for each player k of team j may be determined using:

$$p_{j_k} = \frac{\text{time that player } k \text{ of team } j \text{ plays game}}{\text{total time of game}} \quad (72.1)$$

The ranking matrix A may be updated for the team (j) using:

$$A_{row,j} = \frac{2p_{(j)_{row}}}{\sum_{k=1}^{n_{(j)}} p_{(j)_k} + \sum_{k=1}^{n_{(j+1)}} p_{(j+1)_k}} \quad (72.2)$$

where the fraction time played $p_{(j)_{row}}$ is the fraction time played of the player associated with the row of $A_{row,j}$. The summations in the denominator of Equation (72.2) indicate the sum of the fraction of time played by all players of each of the teams (j) and (j+1). In a similar manner, the ranking matrix may be updated for the losing team (j+1) using:

$$A_{row,j+1} = \frac{-2p_{(j+1)_{row}}}{\sum_{k=1}^{n_{(j)}} p_{(j)_k} + \sum_{k=1}^{n_{(j+1)}} p_{(j+1)_k}} \quad (72.3)$$

where the fraction time played $p_{(j=1)_{row}}$ is the fraction time played of the player associated with the row of $A_{row,j+1}$. The summations in the denominator of Equation (72.3) indicate the sum of the fraction of time played by all players of each of the teams (j) and (j+1).

For example, teams may play a game and be identified by Team A, Team B, and Team C, with each team having two payers identified by Player A1, Player A2, Player B1, Player B2, Player C1, and Player C2. However, player A1 may play only half of the time. After the game, despite the partial play of Player A1, Team A may win over both Teams B and C, and Team B may win over Team C. An example ranking matrix (matrix A) of the players is shown by matrix 1200 of FIG. 12. Specifically, the ranking matrix 1200 has two columns 1202, 1204 defined by the index j which varies from 1 to 2 (i.e., 1 to k-1 where k is the number of teams which in the illustrated example is three). The ranking matrix 1200 has six rows 1206, 1208, 1210, 1212, 1214, 1216 representing each of the two players in each of the three teams, i.e., Player A1, Player A2, Player B1, Player B2, Player C1, and Player C2 respectively. The player rankings for Players A1 and A2 are encoded in the ranking matrix 1200 at matrix elements 1220, 1222, 1224, 1226. Specifically, the player rankings of Players A1 and A2 at matrix elements 1220, 1224 in column 1202 are determined using Equation (72.2) above. The player rankings of Players A1 and A2 at matrix elements 1222, 1226 in column 1204 are determined as zero. The player rankings for Players B1 and B2 are encoded in the ranking matrix 1200 at matrix elements 1228, 1230, 1232, 1234. Specifically, the player rankings of Players B1 and B2 at matrix elements 1228, 1232 in column 1202 are determined using Equation (72.3) above. The player rankings of Players B1 and B2 at matrix elements 1130, 1134 in column 1104 are determined using Equation (71) since none of the players of teams B and C included partial play. The player rankings of Players C1 and C2 are encoded in the ranking matrix 1200 at matrix elements 1236, 1238, 1240, 1242 as with the ranking matrix 1100 of FIG. 11 since none of the players of Teams B and C had partial play.

In some cases, the exact ranking of teams may not available based on the outcome of the game, e.g., the rankings of all teams based on the game outcome may be partial. For example, in some cases, only the ending score of a portion of the teams may be known or determined relative to other teams such as in a racing game where a team crossing a finish line may trigger a timer and the race results may only be able to rank the teams crossing the finish line within the predetermined time after the winner has crossed the finish line.

To illustrate this, in one example, after a game, the relative ranking of Teams C and D may be unknown. Based on the scores and results, it may be determined that Team A won over Teams B, C, and D (based on Team B's score and the lack of score for Teams C and D), and similarly, that Team B won over Teams C and D based on Team B's score and the lack of score for Teams C and D. However, the relative ranking of Teams C and D is unknown based on the game outcome. Specifically, FIG. 13 illustrates the ranking matrix A of partial rankings with the unknown rankings of Teams C and D. The ranking matrix 1300 of FIG. 13 has three columns 1302, 1304, 1305 defined by the index j which varies from 1 to 3 (i.e., 1 to k-1 where k is the number of teams which in the illustrated example is four). The ranking matrix 1300 has eight rows 1306, 1308, 1310, 1312, 1314, 1315, 1316, 1317 representing each of the two players in each of the four teams, i.e., Player A1, Player A2, Player B1, Player B2, Player C1, Player C2, Player D1, and Player D2 respectively. The player rankings for Players A1 and A2 are encoded in the ranking matrix 1300 at matrix elements 1320, 1322, 1323, 1324, 1326, 1327 similarly to that as in the ranking matrix 1100 of FIG. 1100. The player rankings for Players B1 and B2 are encoded in the ranking matrix 1300 at matrix elements 1328, 1330, 1331, 1332, 1334, 1335. Specifically, the player rankings of Players B1 and B2 at matrix elements 1328, 1332 in column 1302 are determined similarly to that as in ranking matrix 1100 of FIG. 11 in comparing Team A to Team B. However, the player rankings of Players B1 and B2 at matrix elements 1330, 1334 in column 1304 and matrix elements 1331, 1335 in column 1305 are unknown since the relative rankings of Teams C and D to Team B are unknown. The player rankings of Players C1 and C2 are encoded in the ranking matrix 1300 at matrix elements 1336, 1338, 1339, 1340, 1342, 1343 and are unknown. The player rankings of Players D1 and D2 are encoded in the ranking matrix 1300 at matrix elements 1344, 1346, 1347, 1348, 1350, 1351 are unknown.

As noted above in constructing the ranking matrix A, the (j)th ranking team is compared to the (j+1)th ranking team. However, as shown in the example ranking matrix of FIG. 13, in the case of Team C, it is unknown whether Team C should be compared to Team B or Team D, and similarly for Team D, it is unknown whether Team D should be compared to Team B or Team C since their exact ranking is unknown. To allow a determination of the ranking matrix in view of partial rankings, the ranking matrix A may be constructed by comparing the (j+1)th team, not with the (j)th team as discussed above with respect to Equations (71) and (72), but rather, with the last team that has a known ranking.

Figure 14:
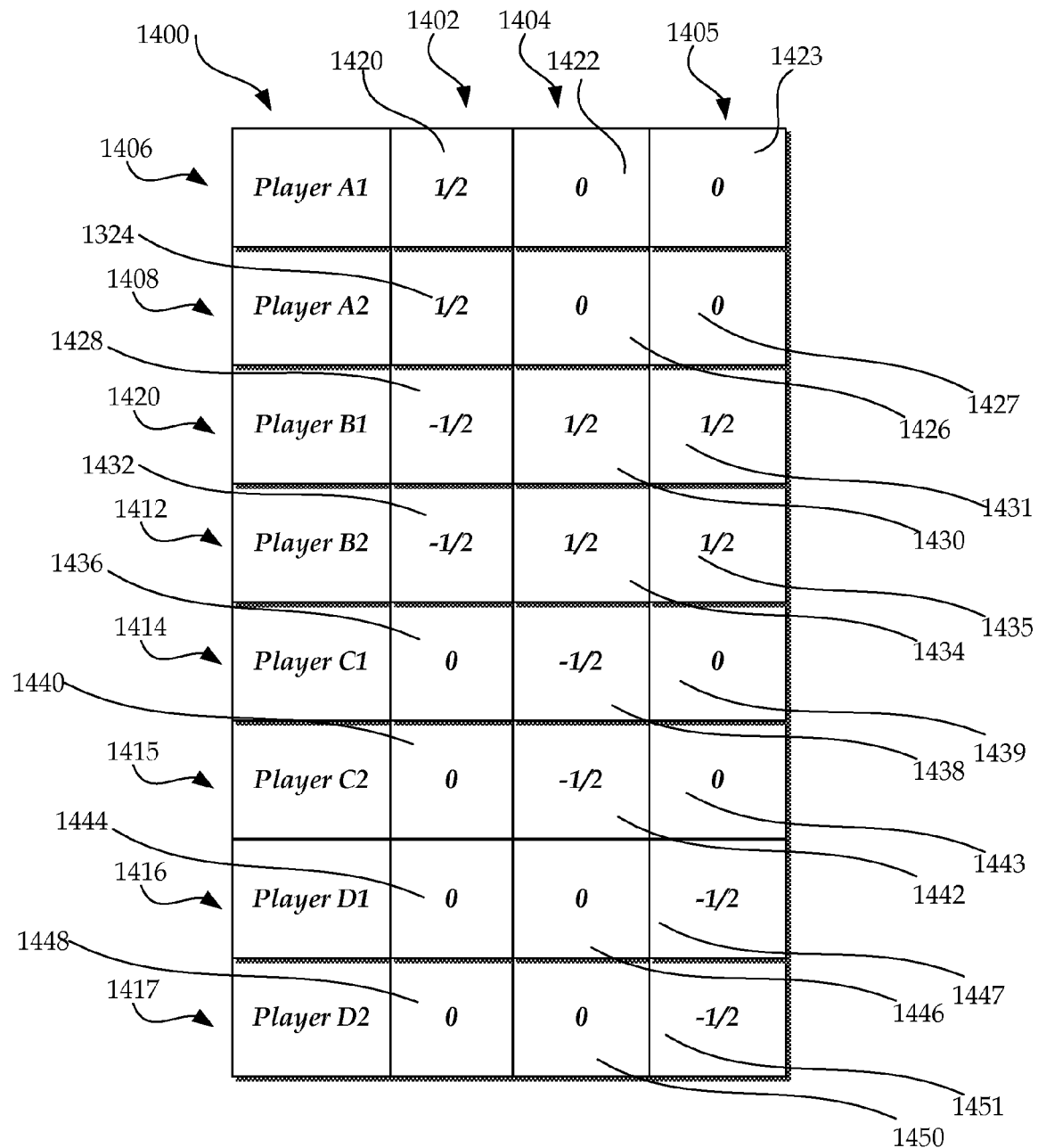
FIG. 14 is a table of an example ranking matrix A incorporating partial rankings.

The example ranking matrix 1400 of FIG. 1400 illustrates a complete ranking matrix with partial input rankings by comparing Team C with Team B, and Team D with Team B. Specifically, the ranking matrix 1400 of FIG. 14 has three columns 1402, 1404, 1405 defined by the index j which varies from 1 to 3 (i.e., 1 to k-1 where k is the number of teams which in the illustrated example is four). The ranking matrix 1400 has eight rows 1406, 1408, 1410, 1412, 1414, 1415, 1416, 1417 representing each of the two players in each of the four teams, i.e., Player A1, Player A2, Player B1, Player B2, Player C1, Player C2, Player D1, and Player D2 respectively. The player rankings for Players A1 and A2 are encoded in the ranking matrix 1400 at matrix elements 1420, 1422, 1423, 1424, 1426, 1427 similarly to that as in the ranking matrix 1300 of FIG. 1300. The player rankings for Players B1 and B2 are encoded in the ranking matrix 1400 at matrix elements 1428, 1430, 1431, 1432, 1434, 1435. Specifically, the player rankings of Players B1 and B2 at matrix elements 1428, 1432 in column 1402 are determined similarly to that as in ranking matrix 1300 of FIG. 13 in comparing Team A to Team B. The player rankings of Players B1 and B2 at matrix elements 1430, 1434 in column 1404 are determined by comparing Team B to Team C using Equation (71) above similar to that as discussed above in ranking matrix 1100 of FIG. 11. Similarly, the player rankings of Players B1 and B2 at matrix elements 1431, 1435 in column 1405 are determined by comparing Team B to Team D using Equation (71) above similar to that as discussed above in ranking matrix 1100 of FIG. 11. The player rankings of Players C1 and C2 are encoded in the ranking matrix 1400 at matrix elements 1436, 1438, 1439, 1440, 1442, 1443 comparing Team C to the last known ranked team (i.e., Team B) and using Equation (72) above. The player rankings of Players D1 and D2 are encoded in the ranking matrix 1400 at matrix elements 1444, 1446, 1447, 1448, 1450, 1451 comparing Team D to the last known ranked team (i.e., Team B) and using Equation (72) above. Although the partial ranking example is discussed with respect to all players playing a full time, it is to be appreciated that partial play using Equations (72.3) and (72.4) may be used to incorporate partial play with partial rankings.

Whether partial play and/or partial rankings are considered or not, the (j)th ranked team is of the same rank as the (j+1) ranked team, then the lower and upper limits a and b of a truncated Gaussian may be set as:

$$a_j = -\epsilon \quad (73)$$

$$b_j = \epsilon \quad (74)$$

Otherwise, if the (j)th team is not of the same rank as the (j+1) team, then the lower and upper limits a and b of a truncated Gaussian may be set as:

$$a_j = \epsilon \quad (75)$$

$$b_j = \infty \quad (76)$$

The determined matrix A may be used to determine 712 interim parameters. Interim parameters may include a vector u and matrix C using the equations:

$$u = A^T \mu \quad (77)$$

$$C = A^T (\beta^2 I + \text{diag}(\sigma^2)) A \quad (78)$$

where the vector $\mu$ is a vector containing the means of the players, $\beta$ is the latent score variation, and $\sigma^2$ is a vector containing the variances of the players. The vectors $\mu$ and $\sigma^2$ may contain the means of the participating players or of all the players. If the vectors contain the score parameters for all the players, then, the construction of A may provide a coefficient of 0 for each non-participating player.

The interim parameters u and C may be used to determine 714 the mean $\Delta$ and the covariance $\Sigma$ of a truncated Gaussian representing the posterior using equations (6)-(10) above and integration limits of the vectors a and b. The mean and covariance of a truncated Gaussian may be determined using any suitable method including numerical approximation (see Gentz, et al., Numerical Computation of Multivariate Normal Probabilities, Journal of Computational and Graphical Statistics 1, 1992, pp. 141-149.), expectation propagation (see below), and the like. Expectation Propagation will be discussed further below with respect to FIG. 9.

Using the computed mean $\Delta$ and the covariance $\Sigma$, the score defined by the mean $\mu_i$ and the variance $\sigma_i^2$ of each player participating in the multi-team game may be updated 716. In one example, the function vector v and matrix W may be determined using:

$$v = AC^{-1}(\Delta - u) \quad (79)$$

$$W = AC^{-1}(C - \Sigma)C^{-1}A^T \quad (80)$$

Using the vector v and the matrix W, the mean $\mu_{j_i}$ and variance $\sigma_{j_i}^2$ of each player i in each team j may be updated using:

$$\mu_{j_i} \leftarrow \mu_{j_i} + \sigma_{j_i}^2 v_{j_i} \quad (81)$$

$$\sigma_{j_i}^2 \leftarrow \sigma_{j_i}^2 (1 - \sigma_{j_i}^2 W_{j_i j_i}) \quad (82)$$

The above equations and methods for a multiple team game may be reduced to the two team and the two player examples given above.

In this manner, the update to the mean of each player's score may be a linear increase or decrease based on the outcome of the game. For example, if in a two player example, player A has a mean greater than the mean of player B, then player A should be penalized and similarly, player B should be rewarded. The update to the variance of each player's score is multiplicative. For example, if the outcome is unexpected, e.g., player A's mean is greater than player B's mean and player A loses the game, then the variance of each player may be reduced more because the game outcome is very informative with respect to the current belief about the scores. Similarly, if the players' means are approximately equal (e.g., their difference is within the latent tie margin) and the game results in a draw, then the variance may be little changed by the update since the outcome was to be expected.

Multiple Team Matching

As discussed above, the scores represented by the mean $\mu$ and variance $\sigma^2$ for each player may be used to predict the probability of a particular game outcome y given the mean scores and standard deviations of the scores for all participating players. The predicted game outcome may be used to match players for future games, such as by comparing the predicted probability of the outcome of the potential game with a predetermined threshold, player indicated preferences, ensuring an approximately equal distribution over possible outcomes (e.g., within 1-25%), and the like. The approximately equal distribution over the possible outcomes may depend on the number of teams playing the game. For example, with two teams, the match may be set if each team has an approximately 50% chance of winning or drawing. If the game has 3 teams, then the match may be made if each opposing team has an approximately 30% chance of winning or drawing. It is to be appreciated that the approximately equal distribution may be determined from the inverse of number of teams playing the game or in any other suitable manner.

In one example, one or more players matched by the player match module may be given an opportunity to accept or reject a match. The player's decision may be based on given information such as the challenger's score and/or the determined probability of the possible outcomes. In another example, a player may be directly challenged by another player. The challenged player may accept or deny the challenge match based on information provided by the player match module.

The probability of a game outcome may be determined by computing the probability of a game outcome y(P(y)) from the probability of the outcome given the scores (P(y|s$_{i_1}$, ..., $s_{i_k}$) where the attained knowledge or uncertainty over the scores $s_{i_1}, \ldots, s_{i_k}$ represented by the mean and variance of each player is marginalized out.

Figure 8:
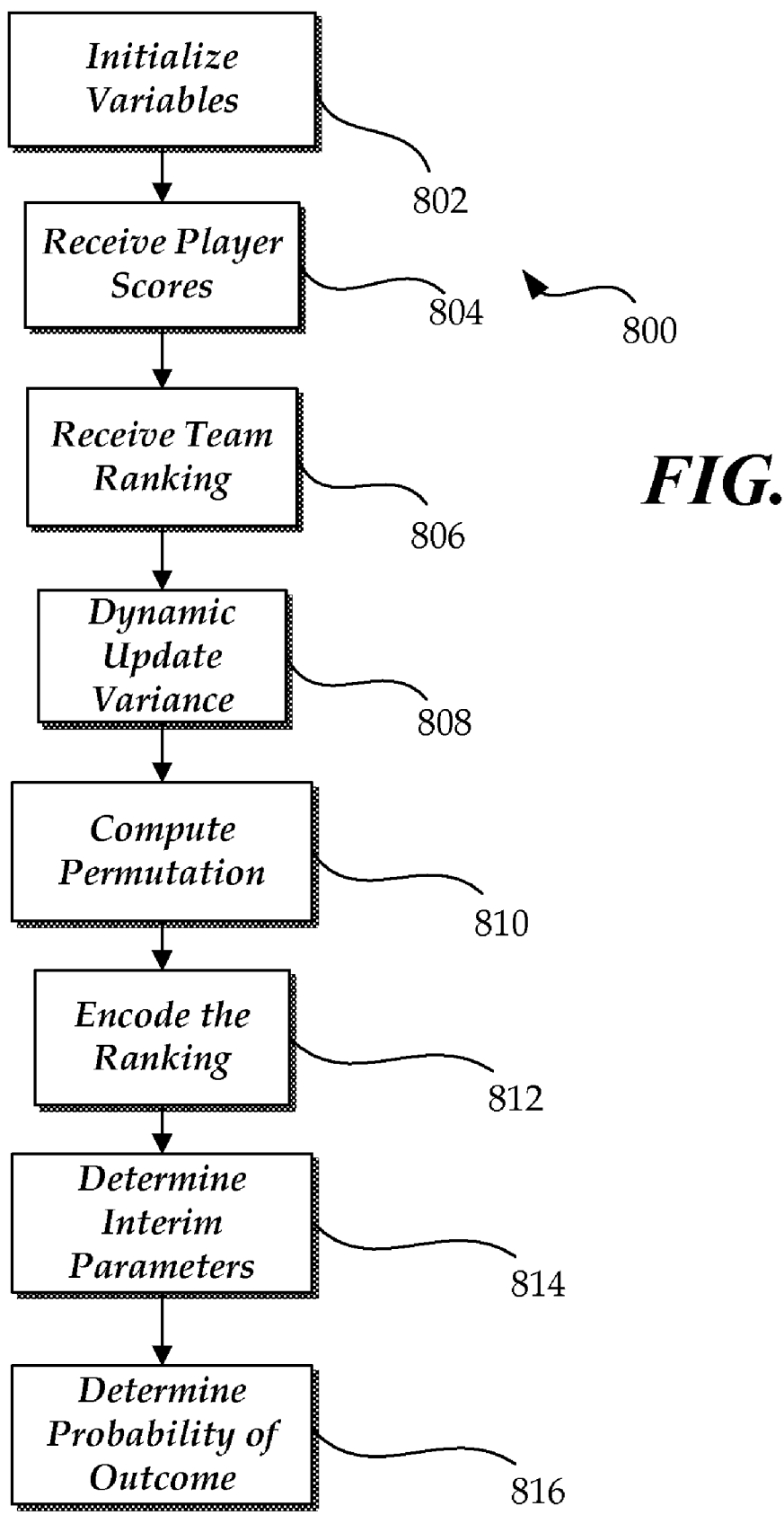
FIG. 8 is a flow chart of an example method of matching scores of multiple teams.

Like the multiple player scoring update equations above, the matching method of FIG. 6 may be modified to accommodate multiple teams of one or more players each. An example modified method 800 of determining the probability of an outcome is shown in FIG. 8. Like above, the static variables, such as the latent score variation β, the latent tie zone ε, the constant dynamic $\tau_0$, and the matrix A, may be initialized 802. The matrix A may be initialized to a matrix containing all zeros.

The score $s_i$ (represented by the mean $\mu_i$ and the variance $\sigma_i^2$ for each participating player i) may be received 804 for each of the players. The ranking r of the k teams may be received 806. For each player participating, the score, such as the variance $\sigma_i^2$, may be dynamically updated 808 for each participating player and may be based upon the time since that player has last played the game, e.g., dynamic update based on time. In this manner, the variance for each potential participating player i, the variance may be updated using equation (31) above.

The scores of the teams may be rank ordered by computing 810 the permutation ( ) according to the ranks r of the players. For example, as noted above, the ranks may be placed in decreasing rank order.

The encoding of the ranking may be determined 812. The encoding of the ranking may be determined using the method described with reference to determining the encoding of a ranking 710 of FIG. 7 and using equations (71-76). Interim parameters u and C may be determined 814 using equations (77-78) above and described with reference to determining interim parameters 712 of FIG. 7. To incorporate the dynamic update into a prediction of a game outcome some time Δt>0 since the last update, an extra summand of $(n_{(j)}+n_{(j+1)})\tau_0$ may be added to the jth diagonal element of matrix C of equation (78) above.

The probability of the game outcome may be determined 816 by evaluation of the value of the constant function of a truncated Gaussian with mean u and variance C. As noted above, the truncated Gaussian may be evaluated in any suitable manner, including numerical approximation (see Gentz, et al., Numerical Computation of Multivariate Normal Probabilities, Journal of Computational and Graphical Statistics 1, 1992, pp. 141-149.), expectation propagation, and the like.

Numerical Approximation

One suitable technique of numerical approximation is discussed in Gentz, et al., Numerical Computation of Multivariate Normal Probabilities, Journal of Computational and Graphical Statistics 1, 1992, pp. 141-149. In one example, if the dimensionality (e.g., the number of players $n_j$ in a team j) of the truncated Gaussian is small, then the approximated posterior may be estimated based on uniform random deviates, based on a transformation of random variables which can be done iteratively using the cumulative Gaussian distribution Φ discussed above.

Since the normalization constant $Z_r(u,C)$ equals the probability of the ranking r, then the normalization constant may be determined by integrating the equation:

$$Z_r(\mu, \sigma) = \int_a^b N(z; u, C) dz \qquad (83)$$

The mean z may be determined using ADF by:

$$\langle z \rangle_{z \sim R(z)} = u(\mu) + \sqrt{C} \left[ v\left(\frac{u(\mu)}{\sqrt{C}}, \frac{\varepsilon}{\sqrt{C}}\right) \cdot \tilde{v}\left(\frac{u(\mu)}{\sqrt{C}}, \frac{\varepsilon}{\sqrt{C}}\right)^{1-y} \right] \qquad (84)$$

Numerically approximating the above equations will provide the mean and normalization constant which may be used to numerically approximate a truncated Gaussian.

Expectation Propagation

Rather than numerical approximation, expectation propagation may be used to update the score of a player and/or predict a game outcome. In the case of multiple teams, the update and prediction methods may be based on an iteration scheme of the two team update and prediction methods. To reduce the number of inversions calculated during the expectation propagation, the Gaussian distribution may be assumed to be rank 1 Gaussian, e.g., that the likelihood $t_{i,r}$ is some function of the one-dimensional projection of the scores s. The efficiency over the general expectation approximation may be increased by assuming that the posterior is a rectified, truncated Gaussian distribution.

Figure 9:
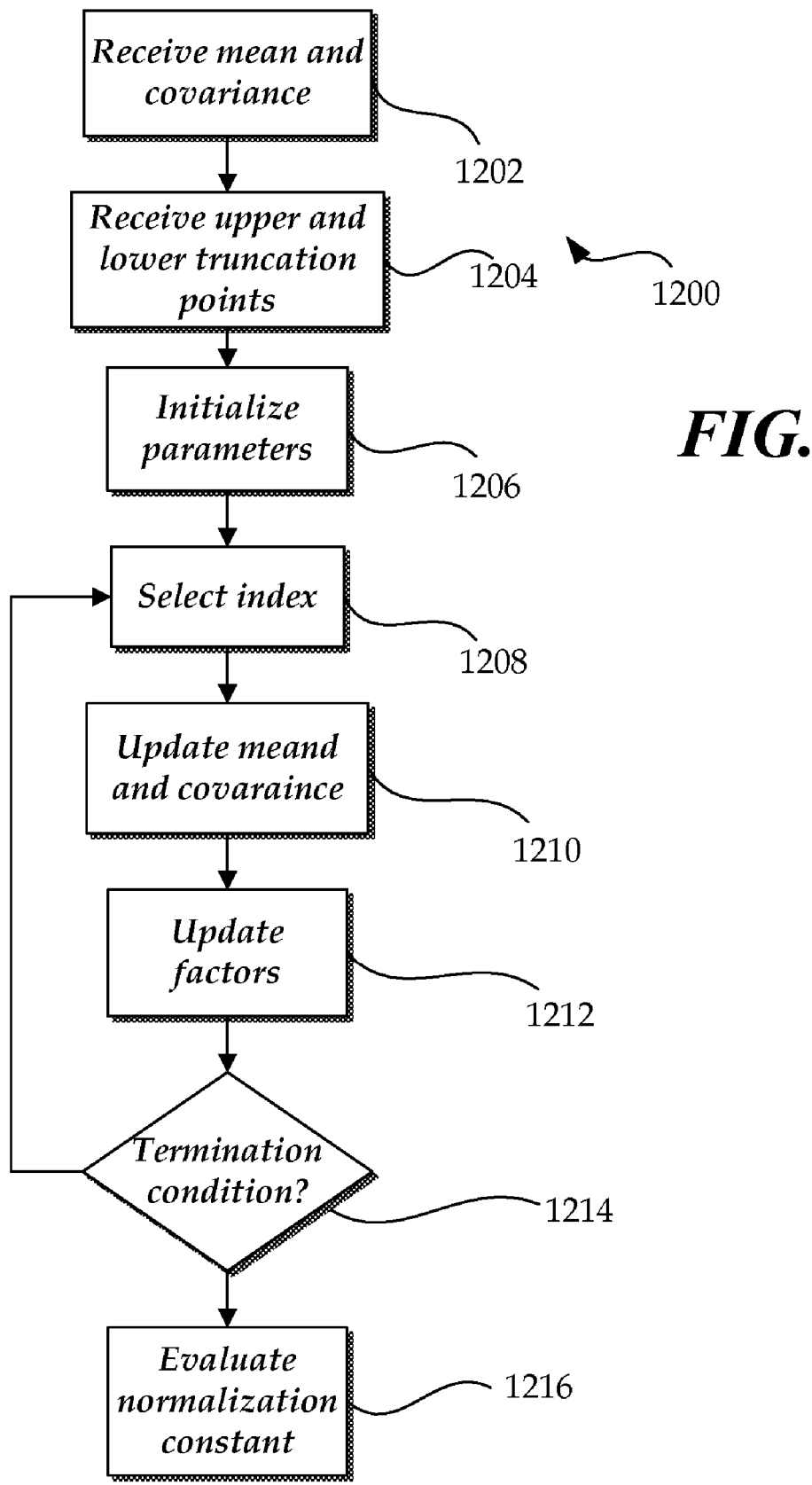
FIG. 9 is a flow chart of an example method of approximating a truncated Gaussian distribution using expectation maximization.

For example, FIG. 9 shows an example method 1200 of approximating a truncated Gaussian with expectation propagation.

The mean μ and covariance Σ of a non-truncated Gaussian may be received 1202, such as in computation of the score updates. It is to be appreciated that the input mean μ and Σ are the mean and covariance of a non-truncated Gaussian and not the mean and variance of the player scores. The mean may have n elements, and the covariance matrix may be dimensioned as nxn. The upper and lower truncation points of the truncated Gaussian may be received. For example, if the jth team is of the same rank as the j+1 team, then the lower and upper limits a and b of a truncated Gaussian may be set for each j and j+1 player as:

$$a_j = -\varepsilon \qquad (85)$$

$$b_j = \varepsilon \qquad (86)$$

Otherwise, if the jth team is not of the same rank as the j+1 team, then the variables a and b may be set for each j and j+1 player as:

$$a_j = \varepsilon \qquad (87)$$

$$b_j = \infty \qquad (87.1)$$

The parameters of the expectation propagation may be initialized 1206. More particularly, for each i from 1 to n, the mean $p_i$ may be initialized to zero or any other suitable value, the parameter $\rho_i$ may be initialized to zero or any other suitable value, the parameter $\zeta_i$ may be initialized to 1 or any other suitable value. The approximated mean μ* may be initialized to the received mean μ, and the approximated covariance Σ* may be initialized to the received covariance Σ.

An index j may be selected 1208 from 1 to n. The approximate mean and covariance (μ* and Σ*) may be updated 1210. More particularly, the approximate mean and covariance may be updated by:

$$\mu^* = \mu^* + \frac{\pi_j(\mu_j^* - \mu_j) + \alpha_j}{e_j} t_j \qquad (88)$$

$$\Sigma^* = \Sigma^* + \frac{\pi_j e_j - \beta_j}{e_j^2} t_j t_j^T \quad (89)$$

where $t_j$ is determined by:

$$t_j = [\Sigma_{1,j}^*, \Sigma_{2,j}, \ldots, \Sigma_{n,j}] \quad (90)$$

and the factors $d_j$ and $e_j$ are determined by:

$$d_j = \pi_j \Sigma_{j,j}^* \quad (91)$$

$$e_j = 1 - d_j \quad (92)$$

The factors $\alpha_j$ and $\beta_j$ may be determined by:

$$\alpha_j = v(\Phi_j', a_j', b_j') / \sqrt{\psi_j} \quad (93)$$

$$\beta_j = w(\Phi_j', a_j', b_j') / \sqrt{\psi_j} \quad (94)$$

where the function $v()$ and $w()$ may be evaluated using equations (17-18) above and the parameters $\Phi_j', a_j', b_j'$, and $\psi_j$ may be evaluated using:

$$\Phi_j = \mu_j^* + d_j(\mu_j^* - \mu_j)/e_j \quad (95)$$

$$\psi_j = \Sigma_{j,j}^* / e_j \quad (96)$$

$$\psi_j' = \Phi_j / \sqrt{\psi_j} \quad (97)$$

$$\psi_j' = \psi_j / \sqrt{\psi_j} \quad (98)$$

$$a_j' = a_j / \sqrt{\psi_j} \quad (99)$$

$$b_j' = b_j / \psi \quad (100)$$

The factors $\pi_j$, $\mu_j$, and $\zeta_j$ may be updated 1212. More particularly, the factors may be updated using:

$$\Pi_j = 1/(\beta_j^{-1} - \Psi_j) \quad (101)$$

$$\mu_j = \Phi_j + \alpha_j / \beta_j \quad (102)$$

$$\varsigma_j = \left( \frac{\Phi(b_j' - \Phi_j') -}{\Phi(a_j' - \Phi_j')} \right) \cdot \exp \frac{\alpha_j^2}{2\beta_j(\sqrt{1 - \psi_j \beta_j})} \quad (103)$$

The termination criteria may then be evaluated 1214. For example, the termination condition $\Delta_z$ may be computed using:

$$\Delta_z = |Z^* - Z^*_{old}| \quad (104)$$

Any suitable termination condition may indicate convergence of the approximation. The determined termination condition $\Delta_z$ may be compared to a predetermined termination toleration criterion $\delta$. If the absolute value of the determined termination condition is less than or equal to the termination toleration criterion, then the approximated mean $\mu^*$, variance $\Sigma^*$, and normalization constant $Z^*$ may be considered converged. If the termination criteria is not fulfilled, then the method may return to selecting an index 1208. If the termination criteria is fulfilled, then the approximated mean and covariance may be returned. In addition, the normalization constant $Z^*$ may be evaluated 1216. More particularly, the normalization constant may be evaluated using:

$$Z^* = \left( \prod_{i=1}^{n} \varsigma_i \right) \cdot \sqrt{|\Sigma^* \Sigma^{-1}|} \cdot \exp\left( -\frac{1}{2} \left( \sum_{i=1}^{n} \pi_i \mu_i^2 + \mu^T \Sigma^{-1} \mu - \mu^{*T} \Sigma^{*-1} \mu^* \right) \right) \quad (105)$$

Matchmaking and Leaderboards

As noted above, the determined probability of the outcome may be used to match players such that the outcome is likely to be challenging to the teams, in accordance with a predetermined threshold. Determining the predicted outcome of a game may be expensive in some cases in terms of memory to store the entire outcome distribution for more than four teams. More particularly, there are $O(2^{k-1}k!)$ outcomes where k is the number of teams and where $O()$ means 'order of', e.g., the function represented by $O()$ can only be different by a scaling factor and/or a constant. In addition, the predicted outcomes may not distinguish between players with different standard deviations $\sigma_i$ if their means $\mu_i$ are identical. In some cases, it may be computationally expensive to compute the distance between two outcome distributions. Thus, in some cases it may be useful to compute the score gap between the scores of two players. For example, the score gap may be defined as the difference between two scores $s_i$ and $s_j$. The expected score gap $E(s_i - s_j)$ or $E[(s_i - s_j)^2]$ may be determined using:

$$E[|s_i - s_j|] = 2\sigma_{ij}^2 N(\mu_{ij}; 0, \sigma_{ij}^2) + \mu_{ij}\left(2\Phi\left(\frac{\mu_{ij}}{\sigma_{ij}}\right) - 1\right) \quad (106)$$

or $$E[(s_i - s_j)^2] = \mu_{ij}^2 + \sigma_{ij}^2 \quad (107)$$

where $\mu_{ij}$ is the difference in the means of the players (i.e., $\mu_{ij} = \mu_i - \mu_j$) and where $\sigma_{ij}^2$ is the sum of the variances of the players i and j (i.e., $\sigma_{ij}^2 = \sigma_i^2 + \sigma_j^2$). The expectation of the gap in scores may be compared to a predetermined threshold to determine if the player i and j should be matched. For example, the predetermined threshold may be in the range of approximately 3 to approximately 6, and may depend on many factors including the number of players available for matching. More particularly, the more available players, the lower the threshold may be set.

Moreover, the score belief of player i can be used to compute a conservative score estimate as $\mu_i - k \cdot \sigma_i$ where the k factor k is a positive number that quantifies the level of conservatism. Any appropriate number for k may be selected to indicate the level of conservatism, such as the number three, may be used for leaderboards. In many cases, the value of the k factor k may be positive, although negative numbers may used in some cases such as when determining 'optimistic' score estimate. The advantage of such a conservative score estimate is that for new players, the estimate can be zero (due to the large initial $\sigma_i^2$) which is often more intuitive for new players ("starting at zero").

Convergence of the Score

The mean $\mu_i$ of a player may not converge on a particular value since it may depend on the true (unknown) probabilities of winning between all players. On the other hand, the variance $\sigma_i$ may converge on a fixed point because every incorporation of data such as game outcomes may decrease the entropy of the skill belief.

The asymptotic variance limit $\sigma_i^*$ may be determined in any suitable manner. For example, in the asymptotic variance limit $\sigma_i^*$, all players may be assumed to have the same standard deviation of the skill belief, i.e., $\sigma=\sigma^*1$. Additionally or alternatively, in the asymptotic variance limit $\sigma_i^*$, only players with equal skills may be matched against each other, e.g., $\mu_A=\mu_B=0$ for the two team example or the vector u=0 for the multiple team example. Additionally or alternatively, it may be assumed that games will not end in a draw between any pair of teams.

The example below is directed toward the multiple team example, since the two team and two player examples are special cases of the multiple team approach. Since the asymptotic limit is being determined, an update of the variance $\sigma^*$ values will leave the variance $\sigma^*$ values unaffected. In this manner, the asymptotic variance $\sigma^*$ may be represented as:

$$\sigma^{*2} = \min_t[(\sigma^{*2} + \tau_0^2)(1 - (\sigma^{*2} + \tau_0^2)W_{t,t})] \quad (108)$$
$$= (\sigma^{*2} + \tau_0^2)\left(1 - (\sigma^{*2} + \tau_0^2)\max_t W_{t,t}\right)$$

where the matrix $W_{t,t}$ depends on the fixed latent variance $\beta^2$, the dynamic time update $\tau^2$, and the asymptotic variance $\sigma^{*2}$. The asymptotic limit may be used to determine the covariance $Z_0$ of a truncated Gaussian with a mean of 0, covariance $C_0$, and integration limits of $(\epsilon 1,++\infty)$ in any suitable manner. For example, with reference to the multiple team update described above, the covariance $Z_0$ and the covariance $C_0$ may be determined using:

$$C=(\beta^2+\sigma^{*2}+\tau_0^2)A^TA=(\beta^2+\sigma^{*2}+\tau_0^2)C_0 \quad (109)$$

$$Z=(\beta^2+\sigma^{*2}+\tau_0^2)Z_0 \quad (110)$$

In this manner, the parameter matrix W may be determined using:

$$W=AC^1(C-Z)C^1A^T=(\beta^2+\sigma^{*2}+\tau_0^2)AC_0^1(C_0-Z_0)C_0^1A^T \quad (111)$$

Assuming that the parameter $w_0$ is defined by:

$$w_0=\max_t[AC_0^{-1}(C_0-Z_0)C_0^{-1}A^T]_{t,t} \quad (112)$$

then the asymptotic limit of $\sigma$ may be determined by using:

$$\sigma^{*2} = (\sigma^{*2} + \tau_0^2)\left(1 - \frac{\sigma^{*2} + \tau_0^2}{\beta^2 + \sigma^{*2} + \tau_0^2}w_0\right) \quad (113)$$

which is a quadratic equation in $\sigma^{*2}$ with the solution:

$$\sigma^{*2} = \tau_0^2\left[\frac{1}{2w_0} + \sqrt{\frac{1}{2w_0}\left(\frac{1}{2w_0} + \frac{2\beta^2}{\tau_0^2}\right)} - 1\right] \quad (114)$$

Matching

As noted above, two or more players in a team and/or two or more teams may be matched for a particular game in accordance with some user defined and/or predetermined preference, e.g., probability of drawing, and the like. In some examples, a good or preferable match may be defined as a match where each player could win the game. Specifically, a match may be desirable if the probability that all participating teams will draw is approximately large.

To determine the probability of a draw to measure if the match is desirable, the dependence on the draw margin $\epsilon$ may be removed by considering the limit as $\epsilon \to 0$. If the current skill beliefs of the players are given by the vector of means $\mu$ and the vector of covariances $\Sigma$ then the probability of a draw given the mean and covariances (P(draw|$\mu,\Sigma$)) may be determined as:

$$P(\text{draw}/\mu, \sum) = \lim_{\epsilon \to 0}\int N(z; A^T\mu; A^T(\beta^2 I + \sum)A)dz \quad (115)$$
$$= N(0; A^T\mu; A^T(\beta^2 I + \sum)A)$$

where the matrix A is determined for the match as noted above in equations (71) and (72).

The draw probability given the scores of equation (115) may be compared to any suitable match quality measure, which may be predetermined in the match module and/or provided by the user. In one example, the match quality measure may be the draw probability of the same match where all teams have the same skill, i.e., $A^T\mu=0$, and there is no uncertainty in the player skills. In this manner, the match quality measure $q_{draw}(\mu,\Sigma,\beta,A)$ may be determined as:

$$q_{draw}(\mu, \Sigma, \beta, A) = \frac{N(0; A^T\mu; A^T(\beta^2 I + \Sigma)A)}{N(0; 0; \beta^2 A^T A)} = \quad (116)$$
$$\exp\left(-\frac{1}{2}\mu^T A(\beta^2 A^T A + A^T\Sigma A)^{-1}A^T\mu\right)\sqrt{\frac{|\beta^2 A^T A|}{|\beta^2 A^T A + A^T\Sigma A|}}$$

In this manner, the match quality measure may have a property such that the value of the match quality measure lies between zero and one, where a value of one indicates the best match.

If none of the players have ever played a game (e.g., their scores of, $\Sigma$ have not been learned=initial $\mu=\mu_0 1, \Sigma=\sigma_0 I$), then the match quality measure for k teams may be simplified as:

$$q_{draw}(\mu, \Sigma, \beta, A) = \quad (117)$$
$$\exp\left(-\frac{1}{2}\frac{\mu_0^2}{(\beta^2 + \sigma_0^2)}1_i^T(A(A^TA))^{-1}A^T 1_i\right)\frac{\beta^k}{\sqrt{(\beta^2 + \sigma_0^2)^k}}$$

If each team has the same number of players, then match quality measure of equation (117) may be further simplified as:

$$q_{draw}(\mu, \Sigma, \beta, A) = \frac{\beta^k}{\sqrt{(\beta^2 + \sigma_0^2)^k}} \quad (118)$$

An example method of determining and using the match quality measure is described with reference to the method 800 of FIG. 8. The parameters may be initialized 802. For example, the performance variance or fixed latent score variance $\beta^2$ may be set and/or the rank encoded matrix A may be initialized to 0. The players scores (e.g., means $\mu$ and variances $\sigma^2=\text{diag}(\Sigma)$) may be received 804, as noted above. The ranking r of the k teams may be received 806 in any suitable manner. For example, the ranking of the teams may be retrieved from memory.

The scores of the teams may be rank ordered by computing 810 the permutation ( ) according to the ranks r of the players. For example, as noted above, the ranks may be placed in decreasing rank order.

The encoding of the ranking may be determined 812. The encoding of the ranking may be determined using the method described with reference to determining the encoding of a ranking 710 of FIG. 7 and using equations (71-76). Interim parameters may be determined 814. For example, the parameters u may be determined using equations (77) above and described with reference to determining interim parameters 712 of FIG. 7. However, rather than the parameter C of equation (78), in the draw quality measure, the parameters $C_1$ and $C_2$ may be determined using:

$$C_1 = \beta^2 A^T A \quad (119)$$

$$C_2 = C_1 + A^T \text{diag}(\sigma^2) A \quad (120)$$

The probability of the game outcome may be determined 816 by evaluation of the value of the constant function of a truncated Gaussian with mean u and variance C. Using the draw quality measure above of equation (116), the probability of a draw may be determined as:

$$P_{draw} = \exp\left(-\frac{1}{2} u^T C_2^{-1} u\right) \sqrt{\frac{|C_1|}{|C_2|}} \quad (121)$$

Two Player Match Quality

The single player, two team example is a special case of the match quality measure. As above, the first player may be denoted A and the second player may be denoted B. The match quality measure q may be written in terms of the difference between the mean scores of the two players and the sum of the variances of both players. Specifically, the difference in means $m_{AB} = \mu_A - \mu_B$, and the variance sum $\zeta_{AB}^2 = \zeta_A^2 + \zeta_B^2$. In this manner, the draw quality measure may be determined using equation (116) above as:

$$q_{draw}(m_{AB}, \varsigma_{AB}^2, \beta) = \exp\left(-\frac{m_{AB}^2}{2(2\beta^2 + \varsigma_{AB}^2)}\right)\sqrt{\frac{2\beta^2}{2\beta^2 + \varsigma_{AB}^2}} \quad (122)$$

The resulting $q_{draw}$ from equation (122) is always in the range of 0 and 1, where 0 indicates the worst possible match and 1 the best possible match. Using equation (122), even if two players have identical means scores, the uncertainty in the scores affects the quality measure of the proposed match. For example, if either of the players score uncertainties ($\sigma$) is large, then the match quality criterion is significantly smaller than 1, decreasing the measure of quality of the match. This determined draw quality measure may be compared to one or more measures of expected skill differences of the players. For example, the measure of skill differences may be in the absolute or squared error sense. For example, one example of an absolute draw quality measure may be:

$$q_1(m_{AB}, \varsigma_{AB}^2, \beta) = \exp(-E[|s_A - s_B|]) \quad (123)$$
$$= \exp\left(-\left(m_{AB}\left(2\Phi\left(\frac{m_{AB}}{\varsigma_{AB}}\right) - 1\right) + 2\varsigma_{AB} N\left(\frac{m_{AB}}{\varsigma_{AB}}\right)\right)\right)$$

In another example, a squared error draw quality measure may be:

$$q_2(m_{AB}, \varsigma_{AB}^2, \beta) = \exp(-E[|s_A - s_B|^2]) = \exp(-(m_{AB}^2 + \varsigma_{AB}^2)) \quad (124)$$

It is to be appreciated that the transformation of exp(-( )) maps the expected gap in the score of the game to an interval of [0,1] such that 1 corresponds to a high (zero gap) quality match.

In the examples of equations (123) and (124), the quality measures may the property that for two players of equal mean skill (i.e., $m_{AB}$=0), then any uncertainty in the skills of the players reduces the match quality (i.e., the value of the quality measure).

Early in the game process, e.g., one or more players or teams have skills with high uncertainty or at the initialized value of mean and variance $\mu_0$ and $\sigma_0^2$), then the quality of a match between two prospective players may be compared against the quality threshold of $q^*_{draw}(0, 2\sigma_0^2, \beta)$. Specifically, the actual quality of a draw between the two players may be evaluated as described above, and may be compared to the quality threshold q*.

After the players skills have substantially converged, e.g., the players variances $\sigma^2$ are substantially 0), then the quality of a match between two prospective players (e.g., $q_{draw}(m_{AB}, 0, \beta)$) may be compared against the quality threshold of $q^*_{draw}(0, 2\sigma^2, \beta)$. Specifically, a match between two players may be accepted if its $q_{draw}$ is less than the draw quality measure $q^*_{draw}$.

The equality of $q_{draw}(m_{AB}, 2\sigma^2, \beta) = q^*_{draw}(m_{AB}, 0, \beta)$ may be solved to determine the difference in means $m_{AB}$ that may be needed to initially get a match accepted. For example, in the case of the match quality $q_{draw}$:

$$m_{AB} = \sqrt{2}\,\beta\sqrt{\ln\left(1 + \frac{\sigma_0^2}{\beta^2}\right)} \Leftrightarrow P(\text{better wins}) = \Phi\left(\sqrt{\ln\left(1 + \frac{\sigma_0^2}{\beta^2}\right)}\right) \quad (125)$$

Figure 10:
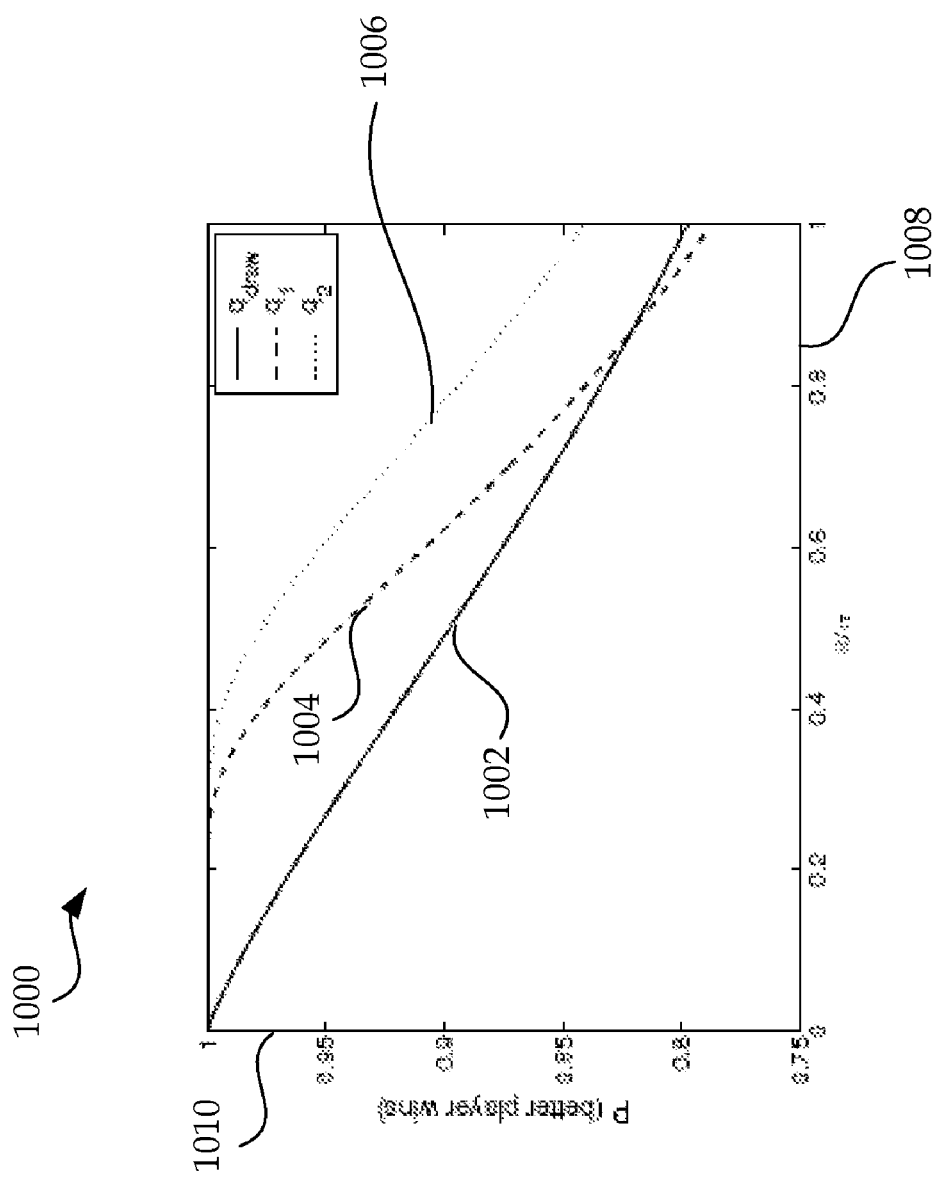
FIG. 10 is a graph of examples of measuring quality of a match.

In this manner, the probability of a better player winning is a function of $\beta/\sigma_0$. Example plots the different draw quality measures of equations (122), (123) and (124) are plotted in the example graph of FIG. 10 as lines 1002, 1004, and 1006 respectively. The axis 1008 indicates the value of $\beta/\sigma_0$ and the axis 1010 indicates the probability that the better player wins of equation (125). As can be seen in the plot 1000, the draw probability of line 1002 better indicates the actual probability of the better player winning.

In some cases, to determine a match between two players, the match module may determine the best match for a player from the available players. For example, a player may enter a gaming environment and request a match. In response to the request, the match module may determine the best match of available players, e.g., those players in the game environment that are also seeking a match. In some cases, the match module may evaluate the $q_{draw}$ for all current players waiting for a match. Based on a critical value of the draw quality (eg., $q^*_{draw}$), the match module may filter out those matches that are less than the critical draw quality q*. One or more of the potential pairings of players meeting the quality measure may be presented to one or more players for acceptance or rejection, and/or the match module may set up the match in response to the determination of a 'good enough' match, the 'best' match available, the matches for all available players such that all players are matched (which may not be the 'best' match) and the matches meet the quality criteria. In some cases, all determined 'good' matches may be presented to a player, and may be, in some cases, listed in descending(or ascending) order based on the quality of the match.

However, the above approach may not scale well for large gaming environments. For example, there may be approximately one million users at any time waiting for a match. Using the actual match quality measure $q_{draw}$ may require the match module to do a full linear table sort which may be considered too computationally expensive. To reduce the computation of computing the probability of all possible game outcomes for all permutations of players seeking a match, the match module may make an initial analysis (e.g., pre-filter prospective player pairings) of the difference in skill levels based on equation (125) and remove those pairings from the match analysis that exceed a simple range check on the skill levels, e.g., the mean score μ and/or the difference in mean scores (e.g., $m_{AB}$).

To create a simple range check for player A, the draw quality measure $q_2$ of equation (124) above is decreasing if either the variance $\sigma_A$ is increasing or if the absolute value of the difference in means $|\mu_A-\mu_B|$ is increasing. Specifically, if the uncertainty in the skill of either of the players grows or if the deviation of mean skills grows, the match quality shrinks. In this manner, from player b's point of view:

$$q_2(m_{AB},\sigma_B^2,\beta) \geq q_2(m_{AB},\zeta_{AB}^2,\beta) \text{ and}$$

$$q_2(0,\zeta_{AB}^2,\beta) \geq q_2(m_{AB},\zeta_{AB}^2,\beta) \quad (126)$$

Thus, if either of the quality measures $q_2(m_{AB},\sigma_B^2,\beta)$ and $q_2(0,\zeta_{AB}^2,\beta)$ are below the critical draw quality measure, then the match module may exclude that pairing since both measures bound the real (but costly to search) matching measure $q_2(m_{AB},\zeta_{AB}^2,\beta)$ from above. More particularly, as long as $q_2(m_{AB},\sigma_B^2,\beta)$ or $q_2(0,\zeta_{AB}^2,\beta)$ are bigger than the critical quality measure, then the match module has not excluded potentially good matches for a player.

The range check of equation (126) may be implemented in any suitable manner. For example, the means μ and the variances $\sigma^2$ for each player A and B may be checked using all three range checks of equations (127), (128) and (129):

$$\mu_A < \mu_B + \sqrt{\log(1/q^*) - \sigma_B^2} \quad (127)$$

$$\mu_A > \mu_B - \sqrt{\log(1/q^*) - \sigma_B^2} \quad (128)$$

$$\sigma_A < \sqrt{\log(1/q^*) - \sigma_B^2} \quad (129)$$

The value of the critical draw quality measure $q^*$ may be any suitable value which may be provided as a predetermined or determined value in the match module and/or as a user preference. In some cases, the critical draw quality measure $q^*$ may be set such that the logarithm of $(1/q^*)$ substantially equals the sum of the variance $\sigma_B^t + t$, where t is either 0 or 1, and where the variance of a player new to the system is set to one. By increasing the value of t, the number of matches or sessions not filtered out is increased until, eventually, all sessions are included.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although the above examples are described with reference to modeling the prior and/or the posterior probability with a Gaussian, it is to be appreciated that the above embodiments may be expanded to allowing arbitrary distributions over players' scores, which may or may not be independent. In the above example, the skill covariance matrix is assumed to be a diagonal matrix, i.e., the joint skill distribution is a factorizing Gaussian distribution represented by two numbers (mean and standard deviation) at each factor. In some cases, the covariance matrix may be determined using a low rank approximation such that rank(Σ)=value d. The memory requirements for this operation is O(n·d) and the computational requirements for all operations in the update technique may be no more than O(n·d²). For small values of d, this may be a feasible amount of memory and computation, and the approximation of the posterior may be improved with the approximated (rather than assumed) covariance matrix. Such a system may be capable of exploiting correlations between skills. For example, all members of clans of players may benefit (or suffer) from the game outcome of a single member of the clan. The low-rank approximation of the covariance matrix may allow for visualizations of the player (e.g., a player map) such that players with highly correlated skills may be displayed closer to each other.

Moreover, although many of the examples presented herein involve specific combinations of method operations or system elements, it should be understood that those operations and those elements may be combined in other ways to accomplish the same objectives. Operations, elements, and features discussed only in connection with one embodiment are not intended to be excluded from a similar role in other embodiments. Moreover, use of ordinal terms such as "first" and "second" in the claims to modify a claim element does not by itself connote any priority, precedence, or order of one claim element over another or the temporal order in which operations of a method are performed, but are used merely as labels to distinguish one claim element having a certain name from another element having a same name (but for use of the ordinal term) to distinguish the claim elements.

The embodiments of the invention in which an exclusive property or privilege is claimed are defined as follows:

1. A method performed by at least one processor, the method comprising:
   a) receiving an outcome of a game between at least a first team opposing a second team, the game comprising physical inputs received by one or more game consoles from at least a first player and a second player belonging to the first team and at least a third player belonging to the second team, the first player of the first team playing a fraction of time that is less than a full time period of the game, wherein the outcome of the game is determined by the received physical inputs;
   b) receiving a first score for the first player, the first score including a first mean and a first variance representing a distribution associated with the first player of the first team;
   c) receiving a second score for the second player, the second score including a second mean and a second variance representing a distribution associated with the second player of the first team;
   d) receiving a third score for the third player, the third score including a third mean and a third variance representing a distribution associated with the third player of the second team;
   e) encoding rankings of the game outcome of the first team and the second team in a ranking matrix based on the outcome of the game and the fraction of time played by the first player, and updating the first mean and first variance using the ranking matrix,
   wherein encoding rankings includes determining a matrix element of a first row and a first column of the ranking matrix by two times the fraction of time played by the first player divided by a sum of the fraction of time played by each of the players of the first and second teams, and determining a matrix element of a second row and the first column of the ranking matrix by two divided by the sum of the fraction of time played by each of the players of the first and second team;

f) updating the second mean and the second variance associated with the second player of the first team based on the outcome of the game and the fraction of time played by the first player that is less than a full time period of the game; and g) providing an indication of the updated first score to at least one of a group consisting of the first player, the second player, and the third player.

2. The method of claim 1, further comprising updating the third mean and the third variance based on the outcome of the game and the fraction of time played by the first player.

3. The method of claim 1, wherein updating the first mean and the first variance includes using the ranking matrix to determine a mean and a covariance of a truncated Gaussian representing a posterior belief in the first score, the second score, and the third score, and using the mean of the truncated Gaussian to update the first mean and using the covariance of the truncated Gaussian to update the first variance.

4. The method of claim 1, wherein encoding rankings includes weighting the rankings based on an average team size over the full time of the game.

5. The method of claim 1, wherein encoding rankings includes determining a matrix element of a third row and the first column of the ranking matrix by negative two times the fraction of time played by the second player divided by the sum of the fraction of time played by each of the players of the first and second teams.

6. The method of claim 1, further comprising receiving a fourth score including a fourth mean and a fourth variance of a fourth player of a third team, wherein the game outcome identifies that the first team beat the second team and the third team, and does not identify whether the second team beat the third team or whether the third team beat the second team.

7. The method of claim 6, wherein updating the first mean and the first variance includes encoding rankings of the game outcome of the first team, the second team, and the third team in a ranking matrix based on the fraction of time played by the first player, a comparison between the first team and the second team, and a comparison between the first team and the third team, and updating the first mean and first variance using the ranking matrix.

8. A method performed by at least one processor, the method comprising:

a) receiving an outcome of a game between a first team, a second team, and a third team, the game comprising physical inputs received by one or more game consoles from at least a first player belonging to the first team, a second player belonging to the second team, and a third player belonging to the third team, the outcome defining that the first team beat the second team and the third team, but not defining a relative game outcome between the second team and the third team;

b) receiving a first score for the first player, the first score including a first mean and a first variance representing a distribution associated with the first player of the first team;

c) receiving a second score for the second player, the second score including a second mean and a second variance representing a distribution associated with the second player of the second team;

d) receiving a third score for the third player, the third score including a third mean and a third variance representing a distribution associated with the third player of the third team;

e) ordering the first team before the second team and the third team;

f) generating a ranking matrix having at least three rows and at least two columns;

g) encoding a ranking of each of the first, second, and third players in each ranking matrix element of the at least three rows, wherein encoding the ranking includes comparing the first player with the second team and third team, comparing the second player with the first team, and comparing the third player with the first team, wherein comparing the first player with the second team includes determining a first matrix element of a first row associated with the first player by two times a fraction of time played by the first player divided by a sum of fractions of time played by each player of the first and second teams, and wherein comparing the first player with the third team includes determining a second matrix element of the first row associated with the first player by two times a fraction of time played by the first player divided by a sum of fractions of time played by each player of the first and third teams;

h) updating the first mean and the first variance of the first score based at least in part on the ranking matrix and on a time played by the first player in the game that is less than a full time of the game;

i) updating the second mean and the second variance of the second score for the second player based at least in part on the ranking matrix and the time played by the first player in the game that is less than a full time of the game; and j) providing an indication of the updated first score.

9. The method of claim 8, wherein the updating includes updating the first score based on the time played by the first player relative to the full time of the game.

10. The method of claim 9, further comprising updating the third mean and the third variance of the third score based at least in part on the ranking matrix.

11. The method of claim 8, wherein comparing the second player with the first team includes determining a first matrix element of a second row associated with the second player by negative two times a fraction of time played by the second player divided by a sum of fractions of time played by each player of the first and second teams, and determining a second matrix element of the second row associated with the second player as zero.

12. The method of claim 8, wherein comparing the third player with the first team includes determining a first matrix element of a third row associated with the third player by negative two times a fraction of time played by the third player divided by a sum of fractions of time played by each player of the first and third teams, and determining a second matrix element of the third row associated with the third player as zero.

* * * * *

UNITED STATES PATENT AND TRADEMARK OFFICE
CERTIFICATE OF CORRECTION

PATENT NO. : 7,840,288 B2
APPLICATION NO. : 11/276226
DATED : November 23, 2010
INVENTOR(S) : Thore K H Graepel et al.

Page 1 of 1

It is certified that error appears in the above-identified patent and that said Letters Patent is hereby corrected as shown below:

In Title page, in Item (75), under "Inventors" column 1, line 2, delete "Rafl" and insert -- Ralf --, therefor.

In column 30, line 57, after "initial" insert -- variance --.

Signed and Sealed this
Twenty-sixth Day of July, 2011

David J. Kappos
*Director of the United States Patent and Trademark Office*